Nov. 17, 1959  W. J. HILDEBRANDT ET AL  2,913,088
DIFFERENTIALLY PROGRAMMED TYPEWRITERS AND TAPE PUNCH
Filed Feb. 25, 1957                                        8 Sheets-Sheet 2
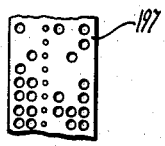
INVENTOR.
WILLIAM J. HILDEBRANDT
SALVATORE J. INTAGLIATA
BY
ATTORNEY

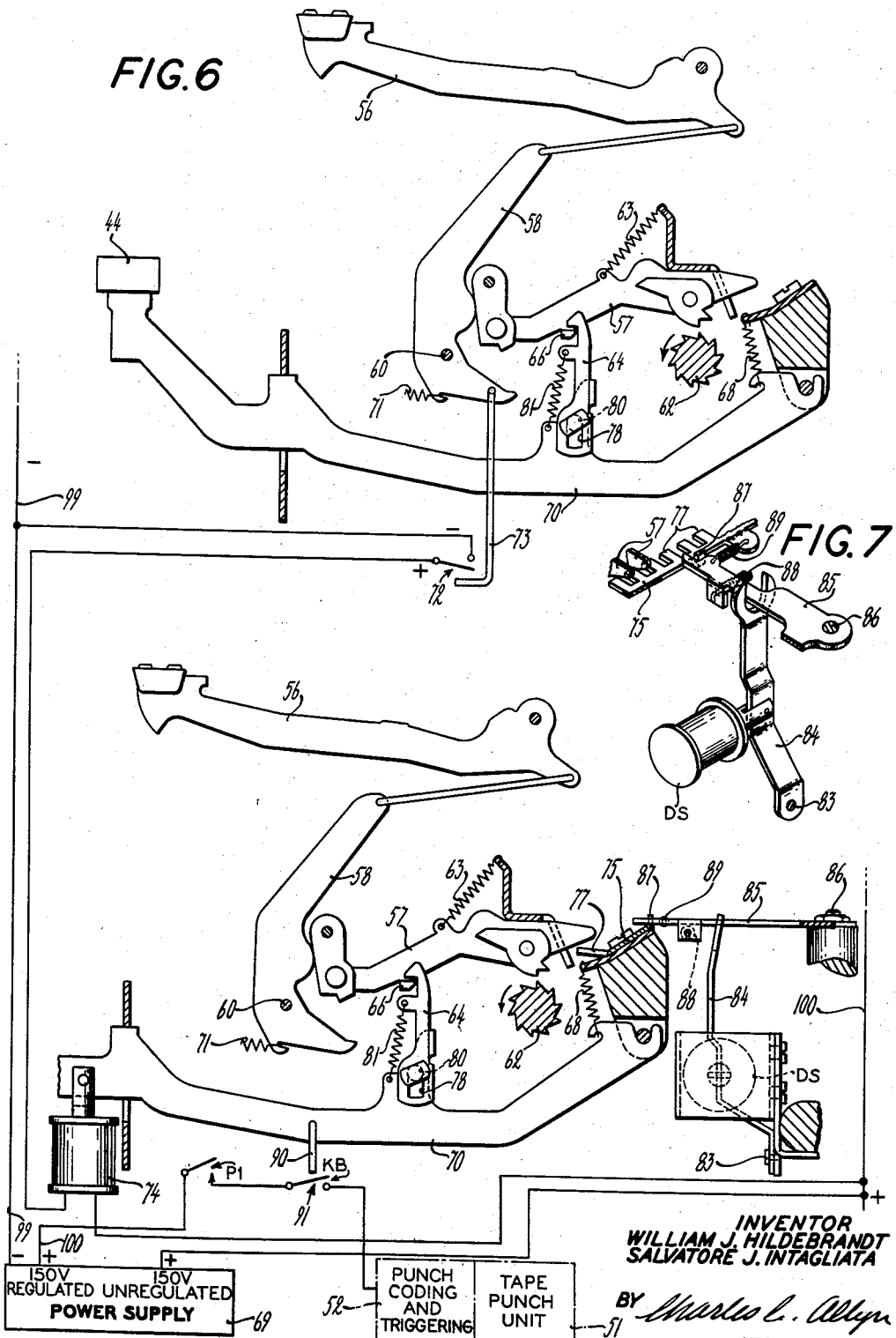
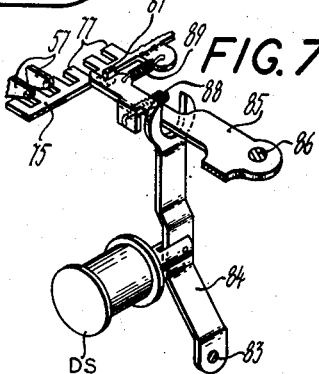

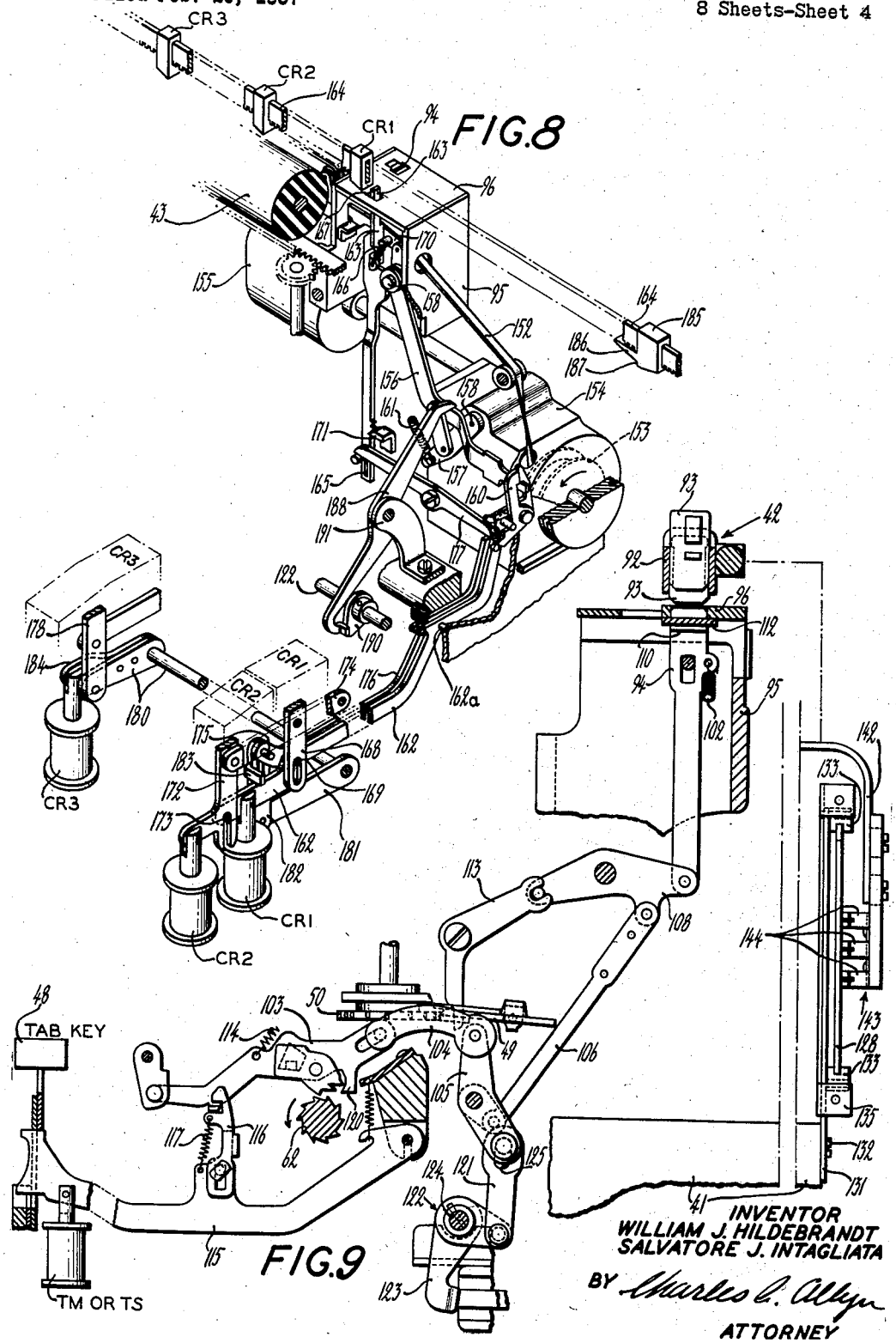

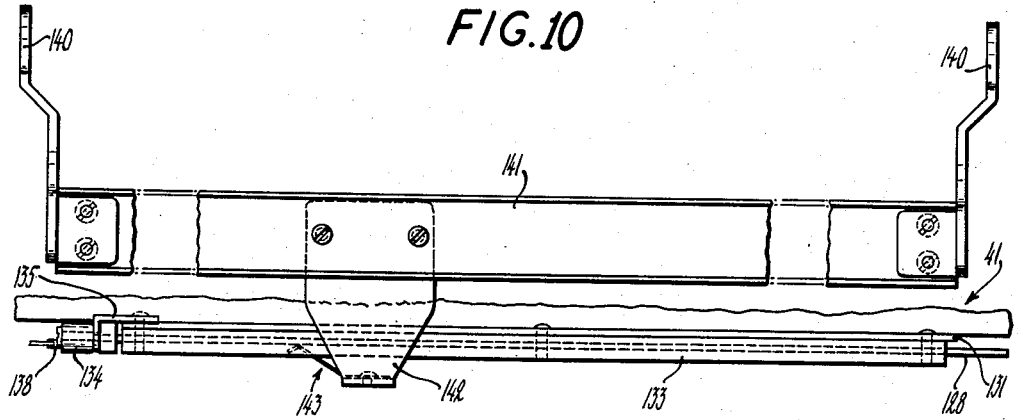
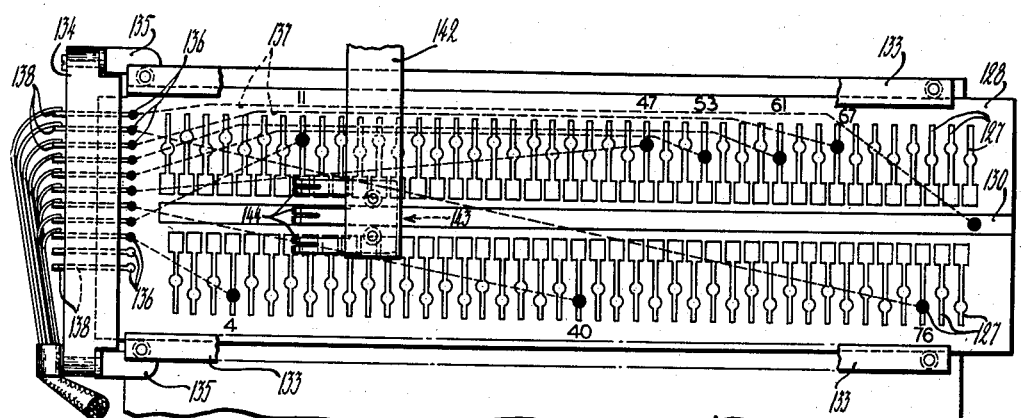

INVENTOR
WILLIAM J. HILDEBRANDT
SALVATORE J. INTAGLIATA
BY Charles L. Allyn
ATTORNEY

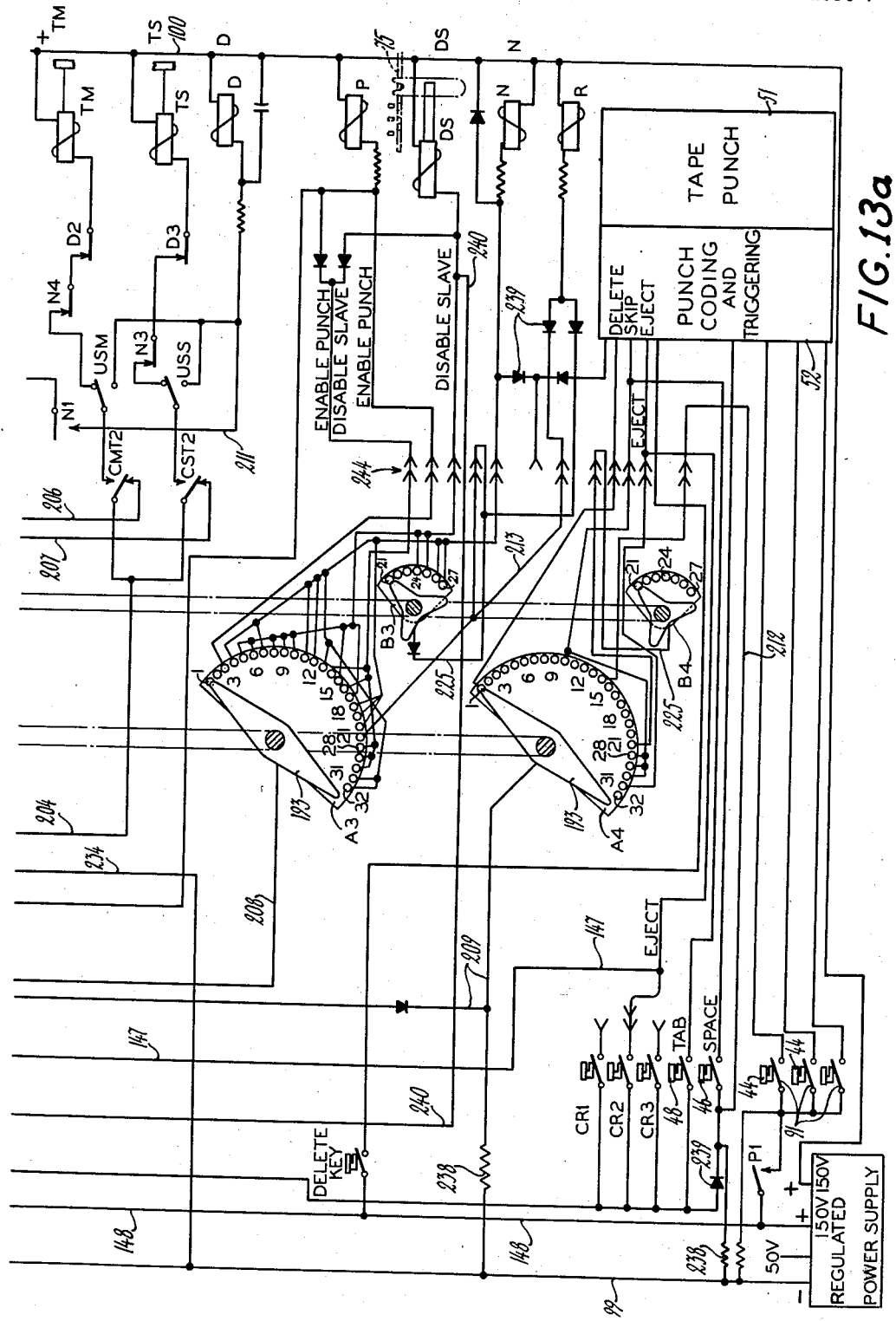

OPERATIONS FLOW DIAGRAM

| # | GANG STEP SWITCH A | GANG STEP SWITCH B | CEASE TAB CONTACT SWITCH A1 or B1 / CARR.RET.SOLENOID MASTER | CEASE TAB CONTACT SWITCH A2 or B2 / CARR.RET.SOLENOID LEAD SLAVE | SWITCH A3 | FUNCTION | CODE INSTRUCTION BY SWITCH A4 TO PUNCH | TAB. SUPPRESSIONS | RELAY R | RELAY RD | TYPING | END REPEAT / MC-KEY / B STEP COIL OPERATIONS |
|---|---|---|---|---|---|---|---|---|---|---|---|---|
| 1 |  | 11 |  | 12 |  |  | DELETE |  |  |  | SHIPPER'S NAME | J A |
| 2 |  | 40 |  | 37 |  |  |  |  |  |  | CONSIGNEE'S NAME | J A |
| 3 |  | 67 |  | 65 | P | ENABLE PUNCH |  |  |  |  | PRO NUMBER | J A |
| 4 |  |  | CR2 |  | N | TAB DISABLE MASTER-SLAVE |  |  |  |  |  | A |
| 5 |  | 11 |  |  |  | DS DISABLE SLAVE |  | HOLD CST |  |  | SHIPPER'S STREET | J A |
| 6 |  | 40 |  |  |  | DS DISABLE SLAVE |  | HOLD CST |  |  | CONSIGNEE'S STREET | J A |
| 7 |  |  | CR2 |  | N | TAB DISABLE MASTER-SLAVE |  |  |  |  |  | A |
| 8 |  | 11 |  |  |  | DS DISABLE SLAVE |  | HOLD CST |  |  | SHIPPER'S CITY+STATE | J A |
| 9 |  | 40 |  |  |  | DS DISABLE SLAVE |  | HOLD CST |  |  | CONSIGNEE'S CITY+STATE | J A |
| 10 |  | 67 |  |  |  | DS DISABLE SLAVE | SKIP PUNCH CODE | HOLD CST |  |  | SHIPPER'S NUMBER | J A |
| 11 |  |  | CR1 |  | N | TAB DISABLE MASTER-SLAVE |  |  |  |  |  | A |
| 12 |  |  | CR1 |  | N | TAB DISABLE MASTER-SLAVE |  |  |  |  |  | A |
| 13 |  |  | CR1 |  | N | TAB DISABLE MASTER-SLAVE |  |  |  |  |  | A |
| 14 |  | 40 |  |  |  | ENABLE PUNCH DISABLE SLAVE | SPACE POSSIBLE | HOLD CST |  |  | WAY BILL DATE | J A |
| 15 |  | 53 |  |  |  | DS DISABLE SLAVE |  | HOLD CST |  |  | WAY BILL NUMBER | J A |
| 16 |  | 61 |  |  |  | ENABLE PUNCH DISABLE SLAVE |  | HOLD CST |  |  | ORIGIN DESTINATION | J A |
| 17 |  | 67 |  |  |  | DS DISABLE SLAVE |  | HOLD CST |  |  | DELIVERY DATE | J A |
| 18 |  |  | CR3 |  | N | TAB DISABLE MASTER-SLAVE |  |  |  |  |  | A |
| 19 |  |  | CR3 |  | N | TAB DISABLE MASTER-SLAVE |  |  |  |  |  | A |
| 20 |  |  | CR3 |  | N | TAB DISABLE MASTER-SLAVE |  |  |  |  |  | A |
| 21 | 21 | 4 |  | 76 |  |  |  |  | R |  | NO. OF PACKAGES | J B |
| 22 | 11 | CR2 | 82 | CR1 |  |  |  |  | R | RD | DESCRIPTION | J |
| 22 |  | CR2 |  | CR1 |  |  |  |  | R | RD | DESCRIPTION | L B |
| 23 | 40 |  | 107 |  |  |  |  |  | R |  | WEIGHT | J B |
| 24 | 47 |  |  |  |  | DS DISABLE SLAVE |  | HOLD CST | R |  | RATE | J B |
| 25 | 53 |  |  |  |  | DS DISABLE SLAVE |  | HOLD CST | R |  | CHARGES | J B |
| 26 |  |  |  |  | N | TAB DISABLE MASTER-SLAVE |  |  | R |  |  | B |
| 27 |  |  | CR3 | CR2 | N | TAB DISABLE MASTER-SLAVE |  |  | R |  |  | B |
| 25 | 53 |  |  |  |  | DS DISABLE SLAVE |  | HOLD CST | R |  | CHARGES | L A |
| 28 | 21 | 61 |  |  |  | ENABLE PUNCH DISABLE SLAVE | SKIP PUNCH CODE | HOLD CST |  |  | TAX | J A |
| 29 |  | 67 |  |  |  | ENABLE PUNCH DISABLE SLAVE | SKIP PUNCH CODE | HOLD CST |  |  | COLLECT | J A |
| 30 |  | 76 |  |  |  | ENABLE PUNCH DISABLE SLAVE | SKIP PUNCH CODE | HOLD CST |  |  | PREPAID | J A |
| 31 |  |  | CR2 | CR3 | N | TAB DISABLE MASTER-SLAVE | EJECT |  |  |  |  | A |
| 32 |  |  |  |  | N | TAB DISABLE MASTER-SLAVE |  |  |  |  |  | A |

United States Patent Office 2,913,088
Patented Nov. 17, 1959

2,913,088

DIFFERENTIALLY PROGRAMMED TYPEWRITERS AND TAPE PUNCH

William J. Hildebrandt, Simsbury, and Salvatore J. Intagliata, Windsor, Conn., assignors to Underwood Corporation, New York, N.Y., a corporation of Delaware Application February 25, 1957, Serial No. 642,279

40 Claims. (Cl. 197—5)

This invention relates in general to typewriters and also to tape punching apparatus controlled thereby. More particularly it relates to electrically interconnected typewriters whereby several typed records may be produced at once with or without preparation at the same time of a punched record.

Ordinarily in respect to interconnected typewriters, when intelligence is typed on one typewriter, the others will type the same intelligence in an identical or very similar arrangement, line for line, that is the connected typewriters will produce records of similar arranged datum.

According to the invention, a program apparatus is provided whereby various datum will be typed on one typewriter in accordance with a predetermined program of arrangement, and whereby such datum, in part or fully, is automatically typed on another typewriter in accordance with another program of arrangement which may be vastly differentiating. For example, the data typed on said one typewriter, which may be called the master, may be scattered in accord with a desired specific arrangement over a number of lines, and the same data may be typed on the slave on one line with possibly some omissions. The invention thus facilitates the preparation of entirely different, but correlated records by a single typing process.

In many work applications, it is desirable to produce as a by-product of the typing operations also a perforated tape record, or equivalent, such record being subsequently available as a control medium to produce, for example, conventional perforated statistical cards, or the equivalent.

It is a paramount object of the invention to provide in connection with a system of connected typewriters wherein two or more records are typed under control of one set of type keys, efficient programming and control means whereby datum typed at intervals under control of said type keys will appear on the work sheet of each machine differently arranged without any special attention by the operator.

It is another object of the invention to provide in an efficient way for the preparation of several related records on a plurality of typewriters under control of a single set of type keys, and to provide efficiently for differently programmed carriage tabulating and returning movements in the several typewriters, the operator, aside from operating the type keys for entry of datum, being merely required occasionally to operate a program advancing key.

Another object is to provide for tabulating movements of one or more typewriter carriages to programmed stations by program selected electrical contacts each of which if selected is sensible to the travel of the carriage to the required programmed, tabulated position to cause a termination of a tabulating operation.

It is a further object related to the foregoing one, to utilize for the tabulating arrest of the carriage conventional tabulating mechanism and to govern it in accordance with the positions of electrically sensible contacts to arrest the carriage as called for by the program apparatus.

A very important object of the invention resides also in the provision of means whereby in conjunction with one or both typewriters, at the option of the operator, a portion of the program may be repeated once or more and whereby the operator may cause the program to be resumed at will.

Also an object of the invention is to provide means whereby the program may come temporarily to a standstill and several entries may be made in the same column with required carriage return operations interposed therebetween.

In association with the various foregoing objects it is a further object to provide automatically for the omission of certain datum, efficiently, on one of the typewriters automatically under control of the program apparatus.

Relatedly to the foregoing objects it is also an object to provide simple and efficient means whereby certain selec datum may be recorded by a tape punch.

It is also a further object to cause under program control automatically the punching of certain instructive codes in a tape punch and also incidental to the operations of certain typewriter controls.

Also it is an object to provide in connection with one or more typewriters for power operated carriage returns automatically under program control to different specific carriage positions.

An important object of the invention is also to provide simultaneously for programmed tabulation in one typewriter and for suppression of a similar tabulation in another typewriter.

Still another object of the invention is to provide manual control means whereby in preparation for starting work, the program apparatus can be caused to assume its initial program condition and whereby further the carriages of the several typewriters, by tabulating operations and/or power carriage return operations will be caused to assume automatically and individually their required initial positions to stand ready for typing.

A still further object is to provide the programming apparatus and related devices in a form permitting it to be set up and changed conveniently and efficiently for all kinds of different work applications.

It is moreover an object to provide operations programming means which allows the skipping of a portion of the program at the will of the operator, the beginning of such skipped portion being preferably variable.

The tabulating means and carriage returning means comprise together a power moving means for the carriage and it is in a broad sense also an object to provide for power carriage movement in both directions under the control of a program apparatus for the purposes stated hereinabove.

The invention, in regard to most phases thereof, is not limited to typewriters in a narrow sense but applies generally to all kinds of record preparing machines.

Many other objects and features will be in part obvious and in part pointed out particularly as the following description of a preferred embodiment of the invention proceeds.

Referring now to the drawings, Figure 1 is a schematic plan view showing a master and a slave typewriter, a tape punch with a coding and triggering unit therefor, and a program apparatus for exercising certain different controls over the several machines.

Figure 2 illustrates a work sheet, adapted to be prepared on the master typewriter, and being in the nature of a waybill.

Figure 3 is a fragmentary showing of a different work sheet adapted to be prepared on the slave typewriter, namely a manifest.

Figure 4 shows a fraction of a punch tape produceable by the tape punch resultant to typing.

Figure 5 shows a statistical record card which may be prepared by known machinery under control of the perforated tape shown in Figure 4.

Figure 6 shows schematically a type action of the master typewriter and a type action of the slave typewriter, along with electrical devices whereby operations of the type keys of the master typewriter will cause identical typing operations in the master and the slave typewriters.

Figure 7 is a schematic, fractional rear perspective view of a mechanism which facilitates disablement of the mechanism of the slave.

Figure 8 is a fractional front perspective view of a conventional three-key carriage return mechanism, along with control solenoids therefor, each, the master as well as the slave typewriters having such a mechanism.

Figure 9 shows a conventional, power actuated tabulating mechanism which is embodied in both the master and the slave typewriters, and additionally shows certain elements to cause repeat tabulations.

Figure 10 is a plan view, as viewed from the rear of the machine, of a rearward extension provided on the carriage of the master as well as the slave, such extensions constituting a portion of a repeat tabulating control device.

Figure 11 is a rear view of a printed circuit plate forming also a portion of said repeat tabulating control device.

Figure 12 is a fragmentary rear sectional elevation of a portion of the tabulating mechanism shown in Figure 9.

Figures 13 and 13a show schematically an operations programming means, along with related instrumentalities of the master and the slave typewriters, and the tape punch, and also with electrical connections.

Figure 1:
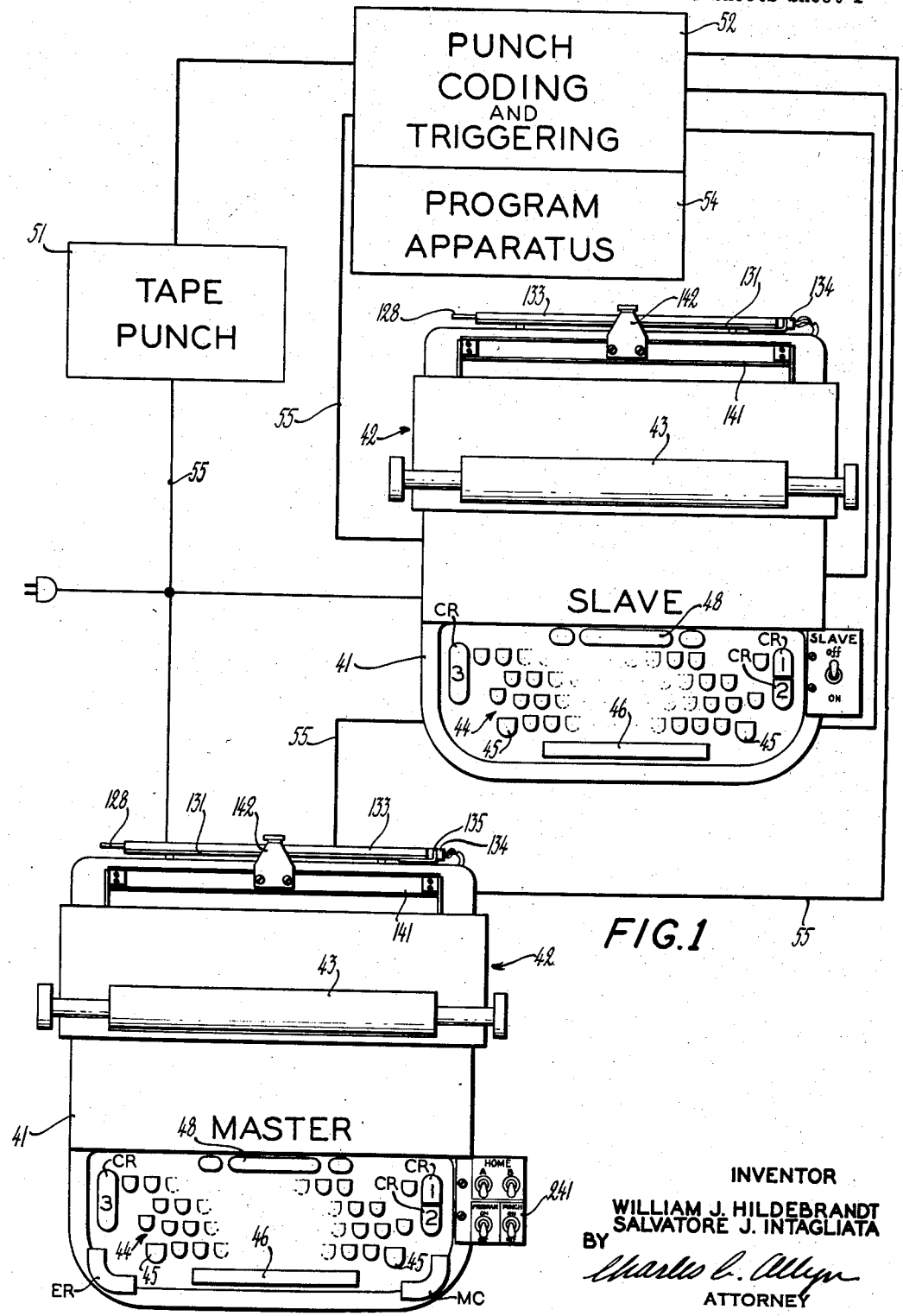

Finally, Figure 14 is a diagram which indicates the flow of operations which by the operations programming are produced in the various machine units.

The master and the slave typewriters are substantially throughout standard Underwood All Electric typewriters, with added mechanism, each typewriter including a main stationary body 41 and a carriage 42 movable thereon as for letter-feeding, tabulating, carriage returning. The carriage of each said typewriter has thereon a platen 43 for supporting a work sheet, line-spaceable to different positions in a usual manner. A numeral 44 designates on each of the typewriters the usual type keys. The master as well as the slave is equipped with usual case shift keys 45 and a space key or bar 46. Both the master and the slave typewriters include also a tabulating key 48. Each of the typewriters includes three carriage return keys CR1, CR2 and CR3 for returning their carriages variably.

The carriage of each typewriter is normally under control of a usual escapement dog 49 engaging an escapement wheel 50, as indicated in Figure 9, and each carriage executes a letter-feed step at each operation of a type key and space bar on the related machine, the carriages being drawn in letter-feed direction by feed springs individually thereto, not shown. Besides the typewriters there are represented in Figure 1 a tape punch 51, a coding and triggering unit 52 for said punch, and a program apparatus 54 schematically shown in Figures 13 and 13a. The stated tape punch 51 and associated unit 52 are the same as disclosed in an application of William J. Hildebrandt, Serial No. 556,178, filed December 29, 1955. The units of the system shown in Figure 1 are connected by various electrical cables 55, the individual wires of which are included in the diagram of the Figures 13 and 13a.

Each typewriter, the master and the slave, embodies a system of power operable type actions of the kind disclosed in the patent to Yaeger No. 2,254,764, dated September 2, 1941, and in Figure 6 there is shown a type action of the master and a related type action of the slave. Each such type action includes a type bar 56 which is operable against the platen 43 of its machine by a power actuator 57 acting through a sub-lever 58. The various sub-levers are pivoted on a common pivot rod 60 and the power actuators 57 of each machine are normally posed above a toothed power roll 62, unoperated, with some clearance therefrom. Springs 63 urge said actuators to be so posed normally. Said power rolls extend transversely in each machine and are continuously driven in the direction of the indicated arrows. In the master typewriter, as well as the slave typewriter, each actuator 57 is adapted to be drawn downwardly into motion-receiving association with the power roll 62 by operation of its related type key 44. The type keys are on supporting levers 70 and, for drawing the actuators 57 down, have each a hook element 64 reaching over a lug 66 thereof. Each key 44 is biased to its normal position, as shown, by a spring 68. Each actuator 57 during its operation becomes automatically divorced from the power roll 62, the type bar striking the platen by momentum and the parts returning to their normal positions under the tension of the spring 63 and a spring 71, the latter associated with the sub-lever 58.

Certain typing operations of the master typewriter are required to be duplicated by the slave typewriter and furthermore certain typing operations of the master are required also to produce code punchings representative of the typed character in the tape punch 51. Referring still particularly to Figure 6, to cause duplicate typing of data in the slave, the master typewriter has pendant from each type action thereof a link 73 to close a switch 72. Closure of any such switch 72 will cause the corresponding type action in the slave to become operated. This is through the energization of a related solenoid 74 which has its armature connected to the appropriate key lever 70 of the slave typewriter. At closure of the switch 72, the solenoid 74 becomes energized through a 150 v.-D.C. power supply indicated at 69 having a negative and a positive output line respectively numbered 99 and 100. Such power supply is the same that serves the punch 51 and its triggering unit, and is shown in the stated application Serial No. 556,178. From the foregoing it will be seen that the hook element 64 of the slave type action at operation of its related solenoid 74 will cause an operation of the related slave type action by the power roll 62 in the slave.

It is required that certain data be typed only on the master typewriter and in such case the program apparatus 54 provides for the operation of a toothed slide 75 in the slave typewriter, see Figures 6 and 7, placing thereby teeth 77 on the slide under the actuators 57 and thereby blocking the latter against being drawn downwardly into motion receiving relation with the power roll 62. In the normal position of the slide 75, the actuators 57 will freely enter between the teeth 77. In order to allow operations of the solenoid 74 of the slave while the actuators 57 in the slave are blocked by the slide teeth 77, the hook elements 64 are yieldingly connected with their key levers 70. Specifically said hook elements are provided with slots 78 by which they are movably borne on studs 80 of their key levers, springs 81 arranged intermediate the key levers and the hook elements 64 causing the latter ordinarily to be drawn down to connect the actuators 57 but being yielding in the event the actuators are blocked by the operated slide 75. The program apparatus 54, in a manner later herein to be brought out, exercises control over the slide 75 by means of a solenoid DS which is adapted to operate an upright arm 84, pivoted at 83, see Figure 7. Said arm 84 has at its upper end a fork connection with a lever arm 85 which is pivoted at 86 on the main framework of the machine. A forward reaching branch of said lever 85 lies to the left of an ear 87 that reaches upwardly from the slide 75, and a spring 89 serves to the latter to follow said ear. A spring 88 biases said lever 85 leftwardly to give said slide 75 normally a leftwardly moved position in which the rear ends of the actuators are adapted to freely enter between the slide teeth 77. Whenever the program apparatus 54 calls for typing only by the master typewriter, it causes the actuation of the solenoid DS to move the slide 75 rightwardly underneath the actuators to block their engagement with the power roll 62. The slide 75 is identical to one shown in a patent to Yaeger No. 2,362,229, dated November 7, 1944, but having the different purpose of suppressing typing at line ends under margin stop control.

In Figure 6 the type key levers 70 of the slave typewriter, through pendant elements 90, are adapted to close switches 91 for transmitting character-representing impulses from the regulated 150 v. output of the power supply 69 to the punch coding and triggering unit 52 for the tape punch 51. A switch P1 in parallel with all of the switches 91, and controlled by the programming device, as will be brought out later, is adapted to render all the switches 91 either potent or impotent for punch control.

Referring now to Figure 9, the master typewriter as well as the slave typewriter embodies a tabulating mechanism substantially of the form disclosed in the patent to Helmond No. 2,303,878, dated December 1, 1942, and such mechanism will now be briefly described. The carriages 42 of both the master and the slave include a usual tabulator stop rack 92, settable stops 93 being provided at line-space intervals on each such rack. Below the rack 92, each typewriter has a projectable tabulator reed 94 in a usual housing 95 reaching into an opening in the top plate 96 of the housing and under the urge of a spring 102 standing normally below the range of set tabulator stops 93. Each typewriter includes a power mechanism for projecting the tabulator reed 94. Specifically an actuator 103 is adapted to be lowered into motion-receiving relation with the toothed power roll 62. When so lowered, the power actuator will execute a transitory power operation which through a link 104 will operate a bail structure 105 having a link connection 106 to a bell crank 108 from which the reed 94 reaches upwardly. In being actuated upwardly, the reed 94, influenced by a spring 102 which exerts a rightward, as well as a restoration urging bias on the reed, bears leftwardly so that a shoulder 110 thereof catches over a ledge provided by a plate 112, becoming thereby detained in projected position, pending the engagement therewith of a tabulating stop 93 in the tabulating run of the carriage which will ensue. Such detained position of the reed 94 is illustrated in Figure 12, which is a rear view, and it will be noted that the reed 94 is ready to intercept the carriage. Incidental to the projection of the reed 94 a lever 113 is operated which frees the escapement 49 from the escapement wheel 50 for tabulating travel under the urge of a usual carriage feed spring, not shown. A spring 114 associated with the actuator 103 keeps the same normally free of the power roll, in normal position. The stated actuators 103 of the master and the slave are each connectable with the power roll through operation of a lever 115 having a hook element 116 overreaching a lug of the actuator. The lever is biased upwardly by a spring 117 to the position seen in Figure 9 and may be operated by tabulator key indicated at 48. For program controlled tabulations the levers 115 of the master and the slave have each respectively a solenoid TM and a solenoid TS associated therewith. Each time upon operation said actuators 103 become automatically divorced from the power roll by a throw-off lug 120 moving into the teeth of the power roll 62, and thus become immediately restored. The master typewriter embodies a switch USM and the slave embodies a switch USS, see Figure 13a. The power operation of the reed 94 of the master operates a switch USM, and similarly, the power operation of the reed 94 operates a switch USS. Such operation in each machine is effected through the bail structure 105 which has a link 121 connection with a rocking structure 122 that includes an arm 123 for operating the pertinent switch. The rocking structure 122 includes a shaft 124 pivotally carried in the framework of the machine and is also subject to operation by the tripping of a carriage return mechanism as will be stated later. In order to allow this independently of the tabulating mechanism the link has a slot 125. The switch controlling mechanism just described is the same as that disclosed in the application of Sharpe et al. No. 539,724, filed October 11, 1955, now U.S. Patent No. 2,848,090, but in distinction therefrom is not subject to any control by the typing mechanism.

Figure 13:
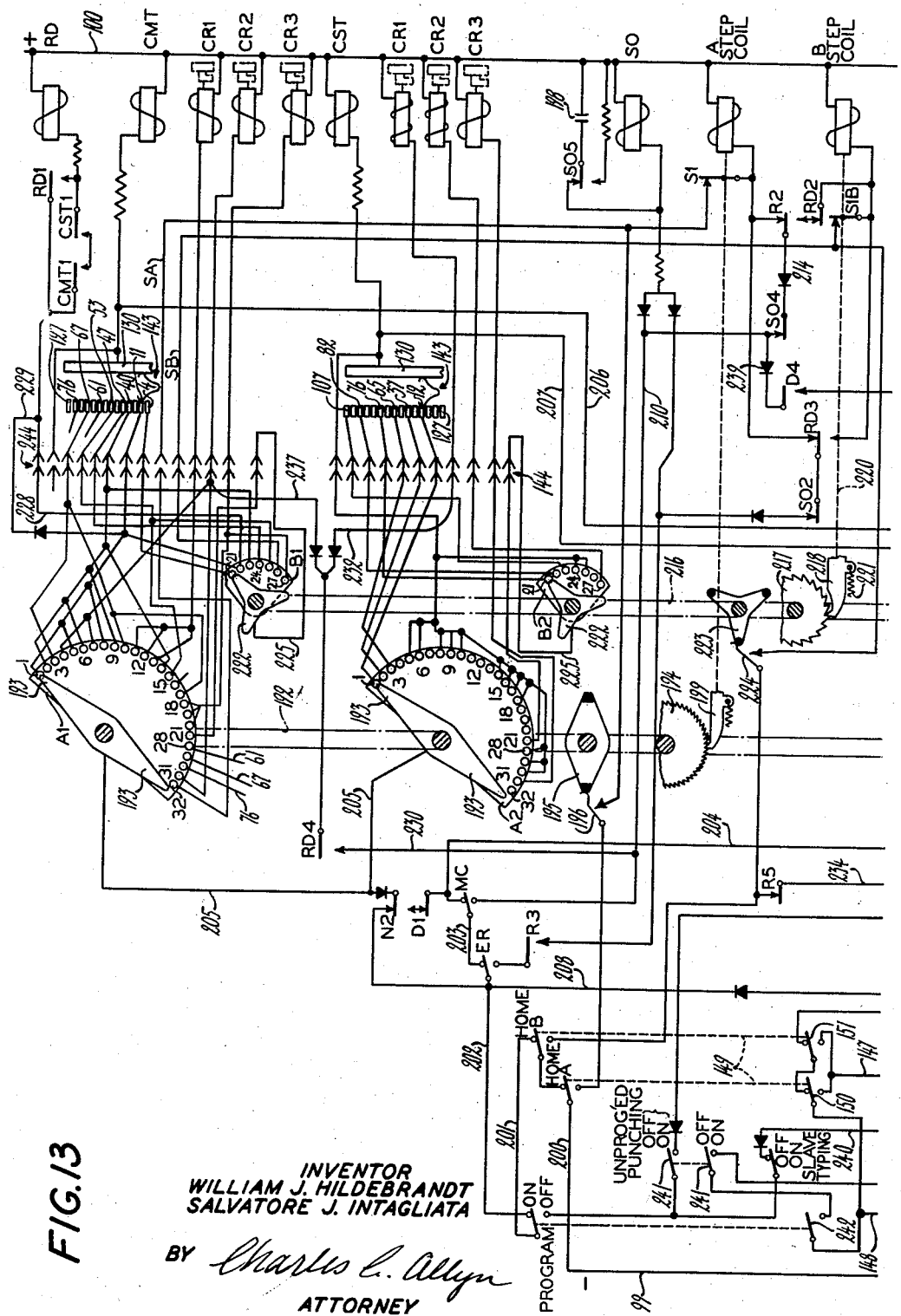

Directing now for the moment attention to the waybill of Figure 2, a carriage position scale 126 is indicated in association therewith and by reference to it, it will be perceived that for entry of various datum on such waybill, tabulations of the master carriage are required to the scale points 4, 11, 40, 47, 53, 61, 67 and 76. Therefore, the master carriage has tabulator stops set at all these stated points. The particular form shown requires tabulations mostly from one column to the next adjoining one, but in some instances columns must be skipped. For example after the consignee's name is typed the carriage is required to pass in indefinite number of columns in order to arrive appropriately in the pro. no. column, namely, in carriage position No. 67. Passage of the carriage through columns is governed automatically by the programming apparatus 54 through use of cease-tabulating contacts generally identified by the numeral 127 and arranged preferably at letter-space intervals lengthwise of the carriage on a stationary plate 128 of insulating material, see Figures 9, 10 and 11. The contacts 127 are selectively rendered live under control of said programming apparatus so that whenever the master carriage arrives in a tabulating stop position called for by the program, there becomes operated a cease-tabulating relay CMT, the latter being shown in Figure 13. Referring to Figure 13a, the program apparatus includes a switch CMT2 related to the tabulation instituting solenoid TM for the master typewriter. This switch CMT2 is controlled by the program apparatus through the relay CMT, to become operated and to stay operated every time the master carriage reaches the particular position to which it is required to tabulate. On the other hand tabulations of the master carriage are instituted by causing the switch CMT2 to restore and by causing current to be supplied over a circuit including such switch, the USM switch and the TM solenoid. Now referring again to Figure 9, the operation of the TM solenoid results in a power actuation of the tabulator reed 94 and the freeing of the carriage for tabulating travel under the power of the carriage feed spring. Upon projection, the reed 94 is detained through its shoulder 110 as is illustrated in Figure 12. Due to the operation of the rocking structure 122, the switch USM becomes operated immediately, opening the circuit for the TM solenoid, as will be appreciated from Figure 13a. Meanwhile the actuator 103 also becomes restored and the relaxation of the TM solenoid will place the hook element 116 into its normal relationship with the actuator 103 ready to effect again its connection. At the encounter of the first tabulating stop 93 with the tabulator reed 94, the carriage will be arrested momentarily, the tabulator reed receiving a small, limited displacement, will retract under the influence of the spring 102 free of the tabulator stop. The escapement 49 takes control over the carriage but allows it to move a good portion of a letter-feed space. Also the parts 108, 106, 105 and the rocking structure 122 will restore. The USM switch is therefore again in its restored position and if the carriage has not yet arrived in a position coincident with a program livened cease-tabulating contact 127, the switch CMT2 will be still residing in the unoperated position. This means that immediately the TM solenoid will again become energized, thereby causing a new operation of the actuator 103. The tabulator reed 94 is therefore again actuated, its upper end rising now to the right of the tabulator stop which just previously cooperated therewith to arrest the carriage. Obviously the carriage proceeds now on a new tabulation. The stated cycle of operation involving the tabulator reed 94 repeats so long as the CMT2 switch remains unoperated, that is until the carriage reaches the position defined by the livened cease-tabulating contact 127. At such time the CMT relay becomes actuated and results in the operation of the switch CMT2. Since there is always a set tabulator stop 93 provided to coact with the tabulator reed when the carriage reaches the position corresponding to a cease-tabulating contact 127, it follows that when the CMT relay becomes actuated under control of a cease-tabulating contact 127, the tabulating run will not only be terminated by the tabulator reed, but also such reed will be caused to restore but this time the restoration of the rocking structure 122, although causing closure of the USM switch, will not be able to cause a reoperation of the tabulation instituting solenoid TM. At the restoration of the tabulator reed 94 the carriage is restored to the control of the letter-feed escapement, as hereinbefore stated.

The apparatus and structure for effecting tabulating control of the slave carriage is substantially the same as that just explained for the master carriage, except that the tabulator stops 93 and the program control cease-tabulating contacts 127 are arranged to suit the requirements of a different work form. In the example of work shown, this is the manifest of Figure 3, and cease or hold tabulating contacts are provided to correspond with carriage positions 12, 37, 65, 76, 82 and 107.

It is understood that both the master and the slave have a plate 128 bearing cease-tabulating contacts 127. In Figure 11 there is shown the plate 128 and supporting structure, which belongs to the master typewriter. Except for different wiring, the same structure is used on the slave. For practical reasons the cease-tabulating contacts 127 are provided in two parallel rows, alternately staggered, there being a contact strip or bar 130 arranged between said two rows. The rows of contacts 127 and the bar extend parallel to the carriage. The plate 128 with its contacts and bar are made up in the fashion of well-known printed circuits. Support for the plate 128 is provided by a panel 131 fastened at the lower end to the rear of the framework of the typewriter, as at 132. The panel 131 has fastened to the rear thereof, two channel members 133 facing toward each other. The plate 128 is slid into position in the channel members 133 to engage a block 134 of insulating material carried on the panel 131 by means of a bracket 135. At one end the plate 128 has a row of conductor elements 136 provided in the same fashion as the contacts 127. At the side of the plate opposite to the contacts 127 there are provided various wires 137 which each has an end extending through the plate 128 and soldered to one of the contacts 127 and which each has another end extending through the plate and soldered to one of the elements 136. Thus only certain contacts 127 are wired and they correspond to the various possible tabulating positions required by the waybill. The block 134 has a row of prongs 138 which make contact with the various wired elements 136 in a resilient manner and there extend leads from these prongs 138 which are identified in reference to the diagram of Figures 13, 13a. Obviously the described structure makes possible the installation of differently wired contact plates 128. The said plate, when pushed into place, is held frictionally by the prongs 138.

On the master carriage, as well as on the slave carriage, there is supported by brackets 140 reaching rearwardly therefrom a bar 141 which extends parallel to the carriage. About midway of the carriage the bar 141 carries a rearwardly and downwardly reaching plate 142 which carries thereon in an insulated manner a contact wiper 143 comprising three fingers 144, the middle one of which wipes along the strip 130 and the other ones of which respectively wipe over the contacts 127.

Both the typewriters, the master and the slave, embody a selective power carriage return mechanism which is illustrated in a general way in Figure 8 and which is standardly furnished in some of the marketed Underwood All Electric typewriters. A patent to Yeager No. 2,393,441, dated January 22, 1946, is similar in the fundamental respects to this mechanism and particularly the carriage controlling functions performed are the same. In fact the mechanism of this patent could be employed instead. For some of the details, reference may also be had to the patent to Yaeger No. 2,362,229, dated November 7, 1944. In Figure 8 a carriage return drawband is indicated on 152. Its left end is operatively connected with the line spacing mechanism on the carriage, as in the stated Patent No. 2,362,229, and the right end is wound upon a drum 153 under the tension of a very light spring, not shown, thereby to take up the slack in said band 152. The said drum 153, as also a normally open carriage return clutch, not shown, is contained within a housing 154. The driver part of said clutch is constantly driven by an electric motor 155 through a speed reduction drive, the latter not shown. The stated carriage return clutch is adapted to be closed through operation of an arm 156 leftwardly from the position seen in Figure 8. A carriage return control lever 157, pivoted at 158, has a link connection with said arm 156. A conventional latch device 160 holds said control lever 157 normally down at its right end, in a carriage return shut-off position and against the tension of a spring 161. Closure of the carriage return clutch follows through the urge of said spring 161 whenever the latch mechanism is actuated through a lever 162 which pivots on a rod 162a. The control lever 157 then swings counterclockwise to a closed clutch position. The drum 153 then winds the drawband and operates first the aforementioned line spacing mechanism and then returns the carriage. The extent of the so effected power return of the carriage is predetermined through selection of one of three carriage return stops CR1, CR2 and CR3 for cooperation with a counterstop arm 163. The stated carriage return stops are adjustably carried on a rack bar 164 of the carriage and are of slightly different form, the stop CR1 having the shortest downward reach and the other two stops having a progressively longer downward reach. The counterstop arm 163 is generally upright and has a pin and slot association with the frame as at 165. It is urged upwardly by a spring 166 so that it stands lifted normally to the limit of said slot association 165 for its upper end to stand in the range of the stop CR1 which reaches down to the least extent. Said spring 166 has a bias action to also urge the counterstop arm 163 rightwardly within a limiting opening 167 provided in the top plate 96 of the housing.

A carriage return key CR1 has a stem 168 which has a pin and slot connection 169 whereby it is adapted to operate the lever 162 to release the latch device 160 and thereby to cause a clutch closing operation of the lever 157. The upper end of the lever 156 has an element 170 which by a pin, at such time, displaces the counterstop 163 leftwardly. In the carriage return which now is under way, the carriage return terminating stop CR1 will strike the counterstop 163 and by displacing it limitedly within the opening 167, will effect through the element 170 a restoration of the control lever 156 to the latch device 160, whereby the carriage return drive mechanism is rendered inactive.

The operations of the CR2 and CR3 keys will each also result in an operation of the lever 162 and thus a tripping operation of the latch device 160 to bring into action the power carriage return mechanism. The depression of the CR2 key moreover will lower the counterstop arm 163 a little to bring it into cooperative range with the CR2 stop, whereas the depression of the CR3 carriage return key will lower said counterstop arm 163 a little more to bring it into cooperative range with the CR3 stop. When so lowered to the varying degrees stated, the counterstop 163 is detained automatically by a dog 171 against upward movement. The CR2 key heads a stem 172 which near its lower end has a pin and slot association at 173 with the lever 162 for operating it. Near the upper end the key stem 172 is guided by a pivoted arm 174 which overlies a pin 175 of a lever 176, the rear end of which lever is associated with a lever 177 to rock it and thereby to impart a downward movement to the counterstop arm 163. The downward motion of the arm 174, in a manner not shown, is limited so that the counterstop arm will be lowered out of the range of the CR1 stop and into the range of the CR2 stop. The carriage return key CR3, which is at the left end of the keyboard, surmounts a stem 178 and when depressed will actuate a bail 180 which includes at the right end of a keyboard an arm 181 having thereon an upreaching link 182. A laterally offset ear 183 on the link 182 overlies the lever 162 to operate the same for carriage return instituting action. At the upper end, said link 183 has a one-way acting connection with a leftwardly extending portion of the pin 175, so that when the CR3 key is operated the lever 176 receives an appropriate motion to lower the counterstop arm 163 to stand in the range of the carriage return terminating stop CR3. Of course, the motion impartable to the bail 180 is appropriately limited and, moreover, the dog 171 will detain the counterstop arm 163 in the appropriately lowered position. The carriage return runs instituted under control of the CR2 and CR3 keys are thus respectively terminated by the CR2 and CR3 stops engaging the counterstop 163. As in the case of a carriage return effected under control of the CR1 key, there is a displacement of the counterstop arm 163 which will restore the control lever 157 to the control of the latch device 160. Moreover, the restoration of the lever, in a usual manner, will automatically release the dog 171 so that the counterstop 163 will spring automatically upwardly to its normal position.

The carriage return mechanism so far described is old and well known. For conditioning the carriage return mechanism variable under the control of the programming apparatus to execute returns terminated selectively under control of the return terminating stops CR1, CR2 and CR3, there are provided three solenoids CR1, CR2 and CR3. The first of said solenoids has its armature connected directly to the lever 162. The second one has its armature connected to an ear on the stem 172 of the key CR2, and the third one has its armature connected to an arm 184 which is unitary with the bail 180. It will thus be seen that when these solenoids are severally actuated they will produce varying power returns of the carriage, the same as instituted by the related carriage return keys.

The manner of control of such carriage return solenoids will be explained later herein in connection with the Figures 13 and 13a.

Under certain circumstances, as will be evident also later herein, returns of the master and the slave carriage are instituted at times in response to the carriage reaching an extreme advanced position. The master carriage, as well as the slave carriage, is thus each provided with a carriage return instituting margin stop 185 shown in Figure 8 and borne on the respective stop rack 164. As will be seen later herein, the requirement is for the master carriage to return automatically to the carriage feed position 11, if it is tabulated beyond the final typing position. Said carriage position 11 coincides with the position of the CR2 stop. The carriage return instituting stop 185 is equipped with a cam element 186, which as the carriage advances toward the counterstop arm 163, will cam the latter downwardly one step into cooperative range of the CR2 stop, the dog 171 being instrumental to detent the counterstop 163 in the so lowered position. Moreover, a face 187 on the carriage return instituting stop 185 will rock the counterstop arm 163 about its lower end, leftwardly within the opening 167. This will, through a bell crank, not shown, but generally as in the stated patent to Yaeger No. 2,393,441, operate the latch device 160 and thus will cause closure of the carriage return clutch. Obviously there will ensue a carriage return which is terminated by the coaction of the CR2 stop with the counterstop 163.

The stop 185 on the slave typewriter has a cam element 186 designed to lower the counterstop 163 to its lowest position for coaction with the CR3 return terminating stop. Obviously, both cam elements 186 are designed to suit the particular program for which the programming apparatus has been set up.

It is desired that during effected carriage returns in the respective machines, the respective rocking structures 122 become operated pending conclusions, thereby to operate the switch USM or USS. The purpose for this will become evident later on in the description. To effect the operation of the rocking structure, see Figure 8, there is provided in each typewriter a lever 188 which has one end overlying the carriage return control lever 156 and has another end operatively associated with an arm 190 of said rocking structure. The lever 188 is pivotally carried upon a bracket 191.

Referring now to the complementary Figures 13 and 13a, the programming apparatus 54 comprises principally a gang step switch A and a gang step switch B, the latter being smaller and both such switches being schematically illustrated. The programming apparatus may be regarded to include many other elements shown in Figures 13 and 13a, for example the step coils A and B respectively for the two gang switches A and B.

The gang switch A embodies a rotor 192 having fast thereon four double-armed contacts or wipers 193. Each of these double-armed contacts 193 is associated with its own arcuate array of electrical taps #1 to #21 and #28 to #32, schematically shown. Said arrays of taps with associated contact arms 193 are shown widely spaced axially of the rotor 192, but this is only for purposes of illustration and actually they are arranged in close layers. The four contact arms 193 and related taps may be regarded to constitute step switches A1, A2, A3 and A4. The rotor 192 is turnable in bearings, not shown, and carries fast thereon a ratchet wheel 194 and also a double arm 195 having tips of insulating material for coaction with a switch 196. The said rotor 192 is shown in an initial program position wherein in each such switches A1 to A4, one branch of the related contact arm 193 is contacting the tap #1 and wherein the diametrically opposite branch is one single tap space beyond a final tap #32. For each program cycle, said gang step switch B takes up a ½ revolution.

The gang switch B is similar in construction to the gang switch A, but smaller. It includes a rotor 216 which has four triple-armed contacts 222, each associated with an array of taps #21 to #27, each triple-armed contact 222 with related array of taps, constituting a step switch and such switches being designated from top to bottom B1, B2, B3 and B4. The rotor of the gang step switch B is numbered 216 and has fast thereon a triple-armed switch operator 223. The gang switch B is shown in its initial program position, and is idly conditioned, as will follow hereinafter. The step switch B executes three program cycles during one revolution of its rotor 216 and therefore has three possible initial program positions, in each of which one arm of the triple-armed switch operator 223 will open a switch 224 and in each of which positions one of the other two arms resides one tap space beyond the final tap #27.

The double-armed switch operator of gang switch A and the triple-armed switch operator 223 of gang switch B have at the extremities of their arms tips of insulating material to actuate the respective switches 196 and 224, said switches being opened in each step movement of their rotors to their initial tap positions, and becoming closed in the first step movement from such initial tap positions.

In the diagram Figures 13, 13a there are shown two switches, designated "Home A" and "Home B," respectively related to the gang switches A and B. These home switches, when operated and then restored will cause the gang switches A and B to assume their initial step positions shown. The manner in which they are instrumental to effect this will be explained later herein. The normal positions of the rotors, however, are usually obtained automatically as the typing of each waybill is concluded, as will later herein be explained.

From Figures 13 and 13a, it will be seen that when two home switches A, B, are in their normal positions, and a "program" switch is on, as shown, and, moreover, the ER and MC switches are in their normal positions, then the leads 200, 201, 202, 203 and 204 are connected and communicative with the negative power line 99. Moreover, a lead 205 branching to the two contact arms 193 of the step switches A1 and A2, through a switch N2 are normally connected to the lead 202. The arm 193 of the step switch A3 has a direct connection 208 with the lead 202 and is thus subject to control by the program switch and the two home switches. Current is normally supplied to the step switch A4 from the 150 v. regulated power supply line 148 over switches 150 and 151 which are operatively connected with the home switches A and B, as indicated by dotted lines 149. Some possible controlling functions adapted to be carried out by the program apparatus 54 which comprise the gang switches A and B, will now be explained in reference to an example of work depicted in Figures 2 and 3 and a related operations-flow diagram shown in Figure 14. In connection with the diagram of Figure 14, it should be realized that normally the slave is conditioned to duplicate typing done on the master and that the switch P1 renders the type keys normally unable to cause the punch 51 to operate.

In the diagram of Figures 13, 13a, the carriage 43 of the master typewriter is under the control of its escapement 49, held in the letter-feed position wherein the contact wiper 143 on the carriage bears on the #11 cease-tabulating contact, that is it is in the carriage position 11. The tap #1 of the step switch A1 has a lead to the #11 cease-tabulating contact of the master typewriter.

The slave typewriter carriage 43 is also under control of its escapement, held in the carriage position 12, so that the wiper 143 on the carriage bears on the cease-tabulating contact #12. A lead connects the tap #1 of step switch A2 with the #12 cease-tabulating contact. It will now be seen that in the initial state of the apparatus shown, the cease master tabulating relay CMT stands energized because current will flow therethrough from the positive power supply line 100 over the wiper 143, the tap #1 of switch A1, the rotor contact 193, the lead 205, a closed switch N2 and leads 202, 201 and 200 to the negative power line 99.

Similarly the cease slave tabulating relay CST stands energized because the wiper 143 of the slave carriage is in contact with the #12 cease-tabulating contact of the slave which has connection with the #1 tap of the step switch A2 and thus with the lead 205. Since the cease-tabulating relays CMT and CST are thus active, the contacts CMT2 and CST2 respectively related to the tabulation master solenoid TM and the tabulation slave solenoid TS stand thus operated and cause the circuits for these solenoids to be open. Moreover, it will be seen that due to the operations of the switches CMT2 and CST2 there are established holding circuits for the solenoids CMT and CST through leads 206 and 207. The tabulation instituting solenoids TM and TS stand thus incapacitated by the switches CMT2 and CST2, respectively, through their holding circuits and it follows that the carriages of both the master typewriter and the slave typewriter are not subject to tabulation until said holding circuits become interrupted as by operation of the switches MC or ER.

By reference to Figures 2 and 3 it will be appreciated that the master carriage is appropriately positioned for the name in the shipper's column on the waybill to be typed and the slave carriage is appropriately positioned for the same name to be typed in the shipper's column on the manifest.

From the tap #1 of step switch A4 there extends a lead to the punch coding and triggering unit 52. This lead is marked "delete" and is made active at the time when the switch A arrives in its initial step position. It causes the punch coding and triggering unit 52 to trigger the punch 51 to produce a delete-signifying combination of holes in a tape record 197.

The operator, as a first step in the preparation of the waybill and the manifest, now fingers the type keys 44 of the master to type the shipper's name. In view of the electrical connections, aforedescribed, whereby the type keys 44 of the slave typewriter duplicate the operations of the type keys 44 of the master, it will be seen that the shipper's name will be typed on the waybill in the master and also on the manifest in the slave. Having reference to the operations-flow diagram of Figure 14, it will be seen that there is no call for the punch 51 to record the shipper's name, there being no punch enable instruction noted on the diagram. The step switch A3 thus has no lead from its tap #1 to the punch enabling relay P which is in control of the switch P1. Therefore, the switches 91 under the slave type keys 44, although operable by the latter are unable to cause operations of the punch 51.

The operator having typed the shipper's name now needs to type the consignee's name in the consignee's column. Preparatory to doing this, the operator operates the main cycle key MC on the master typewriter. This causes current to flow through a step coil A via the switches R2, SO4, the lead 210, the operated MC switch, and the leads 203, 202, etc., into the negative power line 99. The operation of the MC switch also closes a circuit through the slow operating relay SO which is in control over a switch SO4 to interrupt the circuit for the A step coil immediately after its operation. The relay SO is slow operating in view of a capacitator 198 arranged in parallel therewith and causing it to lag in its operation, the relay SO by operating the switch SO5 causing the charge of the capacitor to leak off. The A step coil is mechanically connected with the feed pawl 199 for the gang switch A, so that when circuit for such coil is opened said pawl will impart a feed step to the rotor 192 of said gang switch A, wherefore the various rotor arms 193 are now communicative with the taps #2. After the release of the MC key, the SO relay stands deenergized and therefore the switch SO4 reassumes its normal closed position. Up to the point where the main cycle key MC was operated, the holding circuits for the CMT and CST relays over leads 206, 207 stood active because of the operated positions of the switches CMT2 and CST2. The lead 204 is a necessary link in the holding circuits for the CMT and CST relays, wherefore at the operation of the MC switch these relays relax and cause the restoration of the switches CMT2 and CST2. The restoration of the main cycle switch MC thereupon causes current to flow through the tabulation solenoid TM of the master and the tabulation solenoid TS of the slave. In the case of the TM solenoid, this is over switches D2, N4, USM CMT2, lead 204 and switch MC to the negative power line 99. In the case of the TS solenoid it is over switch D3, N3, USS CST2 and over lead 204. Therefore, in both the master and the slave, the tabulating mechanisms become operated to project their respective tabulating reeds 94 and to release the respective carriages from their escapements 49, causing each carriage to be drawn in letter feed direction in the conventional manner. Meanwhile, the shoulder 110 on each of the tabulating reeds becomes instrumental to detain its read operated as hereinbefore explained.

At this point it should be noted that the advance of the switch arms 193 to contact the #2 taps of the switches A1 and A2 resulted in the connection of the #40 and #37 cease-tabulating contacts respectively of the master typewriter and the slave typewriter to the negative power line 99. The carriage of the master typewriter has a tabulating stop 93 so located thereon that the tabulating reed 94 intercepts the carriage slightly in advance of the feed position 40. In effecting such interception, the reed is slightly displaced leftwardly to free its shoulder 110 from the shelf 112 of the tabulator stop housing and thereby causes its automatic restoration through the spring 102, in a usual manner, the carriage settling so that the wiper 143 thereon contacts the #40 cease-tabulating contact. As the master carriage settles in the feed position 40 the circuit is closed for the cease-master tabulation relay CMT which consequently causes the actuation of the CMT2 switch, establishing thereby a holding circuit over lead 206 for the CMT relay. Moreover the CMT2 switch in being operated opens the circuit for the solenoid TM. The operation of the tabulating mechanism on either typewriter always operates the related USM switch as hereinbefore stated. Therefore, at the operation of the tabulating mechanism, the circuit for the TM solenoid is interrupted automatically causing the immediate restoration of the tabulation instituting actuator 103.

It may be noted here that the operation of the USM, or the USS switch, sends current through the D relay which in turn opens the switches D2 and D3 leading from the relays TM and TS. This is an idle operation insofar as MC key instituted tabulations are concerned but is meaningful under other circumstances, as will later herein become clear.

The tabulating reed 94 on the master, while it is detained by its latching shoulder 110, holds the USM switch operated until such time as the restoration of the tabulating reed 94 occurs. As the reed 94 restores the switch USM becomes restored but this will not reclose the circuit for the TM solenoid because the CMT2 switch has meanwhile become operated by the CMT relay in view of the wiper on the master carriage having made contact with the cease-tabulating contact #40.

The restoration of the main cycle switch MC after its operation has caused the gang switch A to step to its position 2, causes also a tabulation of the slave carriage similar to the tabulation of the master carriage, but to position 37, for the consignee's address to be typed on the manifest sheet. Therefore the slave carriage has a tabulating stop 93 identified with carriage position 37 and further the slave has a live cease-tabulating contact #37 which will be communicative with the wiper on the slave carriage as the latter arrives in that carriage position. It has been stated that when the MC switch is released that current will flow through the tabulation slave solenoid TS. This is after the CST2 switch becomes restored at the downstroke of the MC switch due to an interruption of the circuit for the cease-tabulation relay CST. The operations which thereafter take place in reference to tabulating the slave carriage are substantially identical as have just been outlined with reference to the master carriage and need not be repeated in detail. It may be stated, however, that as the slave tabulator stop 93 identified with the carriage position 37 engages the projected tabulator reed, the latter will become restored and the carriage will be placed under control of the escapement 49. However, before the USS switch fully restores, the cease-tabulating contact #37 will be in circuit with the CST relay, causing it to operate and to render the CST2 switch open, wherefore the TS solenoid for operating the slave tabulator will not be reoperated.

The master typewriter is now in position 40 and the slave carriage is in position 37. The operator fingers the type keys on the master typewriter to enter the consignee's name on the waybill and automatically the slave will duplicate the same typing on the manifest sheet. It may be noted at this point that entering of the consignee's name has no effect on the tape punch 51 because the step switch A3 has no lead from the #2 tap to the P relay, meaning that the P1 switch in series with the switches underlying the slave type keys render such switches ineffective, that is unable to have any triggering effect on the tape punch.

The main cycle key MC is now again operated. This causes current to flow again through the A step coil via the switches R2, SO4, the lead 210, the MC switch, and the leads 203, 202, etc., into the negative power line 99. The circuit over the slow operating relay SO, closes also, interrupting immediately again the circuit for the step coil A. Thus there is again imparted a step feed to the rotor 192 of the gang switch A, wherefore the taps #3 are now live. The tap #3 on the step switch A1 has a lead to the #67 cease-tabulating contact of the master and the tap #3 on the step switch A2 has a lead to the cease-tabulating contact #65, said leads therefore becoming live. The lead 204 became dead at the operation of the MC switch and caused the holding circuits 206, 207 for the CMT and CST relays to become dead also, thereby opening the switches CMT2 and CST2. Therefore, at the restoration of the main cycle switch MC, current flows again through the tabulation solenoid TM of the master and the tabulation solenoid TS of the slave. The tabulating mechanisms of the master and the slave thus become operated to project their respective tabulating reeds 94 and to release the related carriages from their escapements, causing each carriage to be drawn in letter feed direction, the tabulator reeds in both the master and the slave being now held projected by their shoulders 110, as before.

Having now reference to the waybill of Figure 2, it will be noted that below the consignee's column, within the confines thereof, there are a number of narrow columns to which the master carriage needs to be tabulated later on in the course of typing the waybill. These columns thus require also tabulating stops, to make it possible to tabulate thereto. The consignee's name may take up only a few spaces so that tabulation thereafter to the pro. no. column requires passage through several of the stated narrow columns. As the carriage following the operation of the MC switch is being drawn leftwardly due to the instituted tabulation, it will be stopped by the first tabulating stop 93 running against the projected tabulator reed 94. Such tabulating stop may of course be any of said several tabulating stops 93 within the range of the consignee's column. The engaged reed 94 receives consequently its slight displacement causing it to restore and the carriage becomes momentarily held by the escapement. However, the switch USM recloses the circuit for the TM solenoid when the tabulating reed 94 restores, that is when the latter allows the rocking structure 122 to restore. Therefore, a further power operation of the tabulation actuator 103 ensues and the tabulator reed becomes immediately projected again. Here it is to be remembered that the circuit for the CMT relay opened consequential to the depression of the MC key and caused the switch CMT2 to return to normal position so as to be ready to conduct current for operation of the TM solenoid at the closure of the USM switch. The stated process of reoperation of the tab reed continues until the last column within the range of the consignee's columns is passed, that is until the carriage reaches the position No. 67, namely the position for typing the pro. number. As such position is reached, the wiper 143 on the master carriage rides onto the cease-tabulating contact #67. When that happens, the cease-tabulating relay CMT of the master becomes operated and opens the switch CMT2. Therefore, when the tabulator reed becomes engaged by the tabulator stop related to the carriage position No. 67, the closure of the USM switch which follows in consequence, will be unable to effect a closed circuit for the TM solenoid. It follows thus that when the master carriage reaches the position No. 67, the displacement of the tabulator reed 94 and thus the restoration of the tabulating mechanism causes the master carriage to be placed under the control of the escapement, ready to receive the typing of the pro. no. on the waybill.

The manifest work sheet which is on the slave carriage, does not include columns within the consignee's column. The slave typewriter therefore has no intermediate tabulating stops and in view of this, the operation and restoration of the MC key will cause the slave carriage to tabulate in a single movement to the pro. no. column.

The pro. no. will now be typed on the master typewriter, and through the electrical connections, before noted, the same number will be typed on the slave. Inasmuch as tap #3 on the step switch A3 has a connection with the relay P, the switch P1 stands closed so that the type keys 44 of the slave, as the pro. no. is being typed will send impulses to the punch coding and triggering unit 52 to effect recording operations by the punch 51.

The shipper's street address now needs to be entered underneath the shipper's name on the waybill of the master, but is to be excluded from the manifest sheet in the slave. In other words, the carriage of the master typewriter needs returning to the position No. 11, but not the carriage of the slave.

For accomplishing this, the operator now depresses the MC key and this will energize the step coil A to feed the gang switch to the No. 4 position. In conjunction the SO coil acts automatically to reopen the circuit for the step coil A. As always, the operation of the MC key disrupts the holding circuit for the relay CMT and CST, causing the switches CMT2 and CST2 to restore. Meanwhile the operated MC key renders lead 204 temporarily dead, incapacitating the solenoids TM and TS. As the gang switch A moves to the No. 4 position it closes a circuit through the carriage return solenoid CR2 of the master typewriter, current thereby being caused to flow through such solenoid, the tap #4, the lead 205, the switch N2 and the leads 202, etc., to the negative power line 99. At the movement of the gang switch A to the No. 4 position the N relay is also energized in view of the tap #4 on the step switch A3 having a lead communicative therewith. The energization of the latter relay immediately opens the switches N4 and N3, keeping the circuits for the TM and TS solenoids open so that now at the release of the MC key there is no possibility for institutions of tabulations. While the gang switch A, after the operation of the N relay, still resides in the No. 4 position, the current for the step switch A1 and thus to the CR2 solenoid is interrupted by the operation of the switch N2. The operation of the carriage return key CR2 on the master trips the carriage return mechanism for returning action and in turn this effects the operation of the universal member to actuate the USM switch. The tripped condition of the carriage return mechanism prevails for the duration of the return and through the lever 188 maintains the universal member 122, and its associated switch USM, operated. Now when the MC switch is restored by the release of its key, a circuit for the relay D becomes closed over the operated switch USM, the switch CMT2, the MC switch and the leads 204, 203, 202, etc. In turn the D relay, by operation of a switch D4 completes circuits for the step coil A and its circuit interrupting relay SO, the latter of which will stay operated and will open the switch SO4 for the duration of the entire return, thereby preventing reoperation of the step coil A. The stated circuits lead through the closed switch D4, the closed switch N1, the lead 211, the operated USM switch, the unoperated CMT2 switch, the leads 204, 203, 202, etc. The momentary action of the step coil A which resulted, effected an automatic advance of the gang switch A to the No. 5 position. Meanwhile the carriage return may be still under way, it being concluded as the carriage return stop CR2 on the master engages the counterstop 163 and thereby causes the restoration of the control lever 156 to the latch device 160. No reoperation of the carriage return mechanism can ensue because the gang switch A is now in the position 5. Moreover, since at the moment again the carriage reaches its return position, namely position 11, there will be current supplied to the CMT relay, so that the switch CMT2 is open. The CST relay on the other hand stood incapacitated during the carriage return because the CST2 switch was maintained open by the holding circuit 207 of the CST relay due to the non-operation of the USS switch. The TS solenoid must further not be capable to operate in the gang switch positions 5 and 6 and therefore the taps #5 and #6 of gang switch A2 have each a lead to the CST relay to maintain it operated.

The #5 tap on the step switch A1 has a lead to the #11 cease-tabulating contact of the master and as soon as the master carriage completes its return, it brings the wiper 143 into contact with said contact #11. This operates the cease-tabulating relay CMT and renders the CMT2 switch operated, thereby causing the tabulating solenoids TM to stand disabled. The #5 tap of the A3 switch has no lead to the N relay thus all the N switches, and in turn also the switches D2 and D3, are again restored.

The carriage is now in the position 11 and the waybill, by the operation of the carriage return mechanism has also been line spaced, and is appropriately positioned for the operator to type the shipper's street thereon. It is not desired to have the shipper's street appear on the manifest and accordingly tap #5 on the step switch A3 has a lead to the disable-slave solenoid DS which therefore operates the lock slide 75 associated with the type action power actuators 57 of the slave, thereby disabling them.

After typing the shipper's street, the operator again operates the MC key. Similarly as before this advances the gang switch A1, but now to the No. 6 position in which the #6 tap on the switch A1 is in communication with the cease-tabulating contact #40 on the master. Furthermore, responsive to the release of the MC key the master carriage will tabulate as in the position No. 4 of the gang switch A, the tabulation however being terminated automatically by the carriage reaching the position No. 40. The slave carriage will not tabulate because the CST2 switch remains operated so that the CST relay stays activated through the lead from the tap #5 of step switch A2. By reference to the operations-flow diagram it will be seen that in this No. 6 position of the gang switch A, the slave stands again disabled through the operation of the lock slide 75 by the solenoid DS, wherefore when the consignee's name is typed on the master, such name will not be duplicated on the manifest sheet of the slave.

From the operations-flow diagram, it will be perceived that the step positions No. 7, 8 and 9 of the gang switch A are obtained in a manner respectively similar to the positions No. 4, 5 and 6 and that the operations that go along with these positions are respectively the same. All the operator needs to do after the carriage returns to the No. 11 position and the gang switch is in the position 8, is to type the shipper's city and state and then to press the MC key. This causes again only the master carriage to tabulate to the No. 40 position, whereupon the operator types the consignee's city and state. While all this happens, the slave carriage remains stationary, the same as in connection with the step No. 5 and No.

6 positions of the gang switch A, because there are leads from the #8 and #9 taps of the step switch A2 to the CST relay.

Next the shipper's number requires entry on the master only. The operation of the MC key thereafter feeds the gang switch to the position No. 10. This makes potent tap #10 and the connection therefrom to the #67 cease-tabulating contact on the master. As in connection with the No. 3 position of the gang switch A there ensue a number of tabulations which will finally deposit the master carriage in the position No. 67. The slave carriage however will not tabulate because the cease-slave-tabulating relay CST is held active by a connection thereto from the tap #10 of the A2 switch. Moreover, a lead from the tap #10 of the step switch A3 to the DS solenoid actuates the lock slide 75 of the slave. The movement of the gang switch A to the No. 10 position, through a lead from the #10 tap of the step switch A4 into the punch coding and triggering unit 52 will cause a skip code to be recorded in the tape 197 by the tape punch 51. When now the operator types the shipper's number it will be typed only on the waybill of the master and not on the slave, and the tape punch 51 functions only to perforate a skip code. This recorded skip code in the tape 197, and others that follow later in the flow of operations, are made to serve as tabulating instructions in connection with a punch, not shown, for preparation of a statistic card, such as shown in Figure 5.

The operator now depresses again the MC key and this causes a step feed of the gang switch to its No. 11 position and thereby institutes a chain of operations as will presently be explained. First a tap #11 on the switch A1, through a lead to the CR1 solenoid institutes a return run of the master carriage to the position No. 40. The tap #11 on the switch A3 will cause the operation of the N relay, disabling thereby, as in the fourth position of the gang switch A, the tabulating mechanism of both the master and the slave. As an incident to the carriage return, as in the fourth position of the gang switch A, there occurs an operation of the step coil A, the circuit of which is immediately interrupted by the relay SO through operating and opening the switch SO4, which relay thereafter continues to hold such switch open so long as the USM switch remains operated, that is as long as the carriage return control mechanism maintains the carriage return clutch closed and in turn maintains the rocking structure 122 operated. When the carriage return stop CR1 on the master carriage strikes the counterstop 163, the carriage comes to a halt and by the rightward operation of the counterstop 163 effected incidental thereto, the return controlling mechanism 157, 156 is restored automatically to its latch device 160 and this effects also the restoration of the rocking structure 122, and therefore the restoration of the switch USM to its unoperated position. Now, because also the tap #12 of the step switch A1 has a lead to the CR1 solenoid, the latter operates again the carriage return key CR1 solenoid, the latter operates again the carriage return key CR1 of the master typewriter. Therefore the carriage return clutch control mechanism 157, 156 of the master is again tripped to closed clutch position, but because the master carriage stands already returned to the limit of the carriage return stop CR1 shown in Figure 8, the pull on the carriage return drawband 152 will result merely in a line spacing operation followed by an automatic restoration of the clutch control mechanism 157, 156 to the normal position seen in Figure 8. As in the carriage return operation effected resultant to the No. 11 step position of the gang switch, there ensues now as a result of the No. 12 step position an operation of the step coil A, the SO relay interrupting automatically the circuit of such coil and preventing its reoperation until the carriage return clutch control mechanism again restores.

The gang switch A has now the position No. 13 and consequential thereto there ensues another operation of the carriage return solenoid CR1 to cause the carriage return mechanism of the master to effect another line spacing operation, exactly as in connection with position No. 12 of the gang switch A. In accompaniment there results a further movement of the gang switch A to the position No. 14.

The #14 tap on the step switch A1 now makes live the #40 cease-tabulating contact on the master. Also, a lead from the #14 tap on the switch A3 causes the operation of the P relay and the DS relay. The P relay by closing the switch P1 in series with the switches 91 underlying the slave type keys 44, renders such keys potent to effect upon operation recordings in the tape punch 51. The operation of the relay DS operates the lock slide 75 in the slave to disable the typing mechanism therein. At this time also the tap #14 of step switch A4, through a lead 212 renders the switch underneath the space bar 46 of the slave potent to cause upon operation the recording by the punch 51 of space-signifying holes. Still further, a lead from the #14 tap of the switch A2 renders the cease-tabulating relay CST active to operate and hold operated the switch CST2 pending the next operation of the MC key.

The operator now types the waybill date on the master typewriter, there being no typing done in the slave typewriter due to the operation of the lock slide 75, but type-key and space-key controlled impulses nevertheless being transmitted to the punch coding unit 52 for effecting in the punch 51 perforations representative of the date.

The operator now presses the MC key to bring the gang switch to the position No. 15, wherefore the tap #15 on the switch A1 is then active with respect to the #53 cease-tabulating contact. At the release of the MC key current flows again through the tabulating solenoid TM, causing the tabulating actuator 103 of the master to execute a stroke, thereby projecting the tabulator reed 94 and releasing the master carriage for movement. There ensue now one or two tabulations until the carriage arrives in the position No. 53, in which position the cease-tabulating relay CMT becomes energized and by operating the switch CMT2 prevents further energization of the tabulation master solenoid, the carriage by being intercepted by the tabulator stop in position No. 53 coming then again under the control of the escapement 49. It should be observed that in the position No. 15 of the gang switch A, the slave is disabled by a lead from #15 tap of the switch A3 to the DS relay. Therefore, when the type keys are then fingered to enter the waybill number, such number will only appear on the master.

Operation again of the MC key will bring the gang switch to position No. 16. Having reference to the operations-flow diagram, it will be seen that consequently the master carriage will tabulate to the position No. 61 but the slave carriage will remain still in position 65 because of a lead from a tap of step switch A2 to the CST relay. The slave is now disabled but the punch enabled. The cease-tabulating relay CST, for the slave remains still operated and provides that at the next operation of the MC key there will still be no tabulation of the slave carriage. The operator now types in the orig. dest. column, which data will be recorded by the punch 51 but omitted from the manifest.

The MC key when operated again results in the feeding of the gang switch to the No. 17 position, and as a result thereof the carriage tabulates automatically, in the single jump to the position No. 67. The tap controls of the gang switch A, now effective, are similar as in reference to the position No. 15 of the gang switch so that when the operator types the delivery date on the master, it will be recorded neither by the slave nor by the punch 51. The gang switch A is then brought to the position 18 by operating the MC key. On the downstroke of such key, the holding circuits for the CMT and CST relays are broken by the switch MC, causing the restoration of the CMT2 and the CST2 switches. Also on the downstroke of the MC key the step coil A and its circuit interrupting relay SO are operated. Before the upstroke of the MC key, the gang switch A will thus be in the position 18, and by reference to Figures 13 and 14, it will be seen that the CR3 solenoid of the master is now connected to the tap #18 of the step switch A. However such CR3 solenoid will not immediately become energized because the operation of the N relay by the tap #18 opens the switch N2 which in Figure 13 is shown near the switch. Upon the release of the MC switch current will flow through the CR3 solenoid of the master, through the tap #18 of the step switch A1, the line 208, the operated switch N2 and the closed switches D1 and MC. Meanwhile, the TM and TS solenoids have been incapacitated by the switches N3 and N4 which were operated along with the switch N2. The operation of the CR3 solenoid of the master actuates the CR3 return key and institutes a carriage return in the master. This in turn operates the rocking structure 122 and results in the operation of the USM switch which now will send current through the D relay. Thus a circuit will be established from the line 204 over the unoperated CMT2 switch, the operated USM switch, the operated N1 switch, the operated D4 switch, the unoperated SO4 switch, and the R2 switch and the step coil A, the SO relay functioning automatically to reopen the circuit for the step coil A. Therefore the gang switch A steps to the position 19 while the carriage return may still be in progress. As the CR3 return stop of the master strikes the counterstop 163, namely as the letter-feed position 4 is reached, the carriage return control mechanism 156, 157 of the master becomes restored and through the lever 188 and the rocking structure 122 causes the restoration of the USM switch.

Now, because the step switch A1 has further taps #19 and #20 which are all electrically connected with the CR3 solenoid of the master, there result automatically two additional operations of the carriage return mechanism of the master which however serve merely to line space the waybill there being a step-feed of the switch A effected therewith. The gang switch A will therefore arrive in its position 21. The waybill thereby becomes appropriately positioned to receive an entry in the column denoted "No. Pkgs." Up to the moment of the feed of the step switch to the position 21 the slave carriage resided in the position 65, however, with the relaxation of the relay N at such time, a tabulation of the slave carriage becomes instituted by the operation of the TS solenoid, it being noted that a circuit therefore becomes established over switches D3, N3, USS, CST2, lead 204 and the MC switch. The tabulation will be terminated by the arrival of the slave carriage in the position 76, under the control of the tap #21 on the step switch B2 of the gang switch B. This is because the movement of the gang switch A to the position 21 renders a connection 225 between the tap #21 of step switch A to a rotor 216 of a gang switch B live, and in turn the tap #21 on the step switch B2 becomes connected to the cease-tabulating contact #76 on the slave typewriter and renders such contact live. In other words, as the slave carriage reaches the position 76, the CST relay becomes active to operate the switch CST2 and thereby prevents a further institution of a tabulation.

At this point it will be beneficial to observe that entries on the waybill embracing the columns "No. Pkgs." along to and including the "Charges" column may be continued over several lines, inasmuch as usually there are shipped a number of items. The same is true of the equivalent columns that appear on the manifest. To provide for the control of the two typewriters repetitiously the same over the stated range for as many lines as may be necessary, the aforesaid small gang step switch B is provided. It supplements the gang switch A and assumes control automatically as the gang step switch A arrives in the step position No. 21. When the required number of lines have been written over the stated column range, the operator depresses an End Repeat Key which places the two machines again under the control of the gang switch A.

The movement of the gang switch A to the position No. 21 has a number of effects, one is that the tap #21 of switch A3, through a lead 213 renders the relay R of switch A3, through a lead 213 renders the relay R effective to actuate a switch R2 which in the electrical diagram is shown close to the step coils A and B, said switch R2 when so operated connects with lead 214 step coil B and disconnects step coil A. Therefore step coil B is now potentially responsive to the operation of the MC switch. The rotor 216 of the gang switch B is common to the switches B1–B4 and includes a ratchet wheel 217 for stepwise actuation by a feed pawl 218 which is operable by the step coil B. The step coil B has a connection with the feed pawl 218, as indicated by a dotted line 220. At the actuation of the step coil B the pawl 218 takes up a new feed position with reference to the ratchet wheel 217 and as the step coil relaxes a spring 221 effects a step feed of the ratchet wheel, inclusive the rotor 216.

The taps #21 of each of the gang switches A1–A4 have each a lead 225 to the contact arms 222 respectively of the switches B1, B2, B3 and B4 so that now the taps #21 of the latter switches are live and continue to be live for some time inasmuch as for the time being the gang switch A will be standing still in view of the step coil A having been incapacitated by the operation of the switch R2.

Now having reference to the operations-flow diagram of Figure 14 it will be seen that in the position 21 of the gang switch B, the master carriage is in letter-feed position No. 4 and the slave carriage is in letter-feed position No. 76. Moreover because the switch B1 has a lead from the #21 tap to the #4 cease-tabulating contact of the master, the CMT relay, through operation of the switch CMT2 incapacitates the TM solenoid to prevent institutions of tabulations. Likewise because the lead from the tap #21 of the switch B2 has a lead to the #76 cease-tabulating contact of the slave, the CST relay, through operation of the CST2 switch incapacitates the TS solenoid. The operator now types in the "No. Pkgs." column on the waybill and such typing will be duplicated on the slave in the appropriate column.

The depression of the MC key causes current to flow through the step coil B, the closed circuit including switch RD2, operated switch R2, the closed switch SO4, the lead 210, the operated switch MC, and the unoperated switch ER, the current being interrupted by the slow energization of the SO relay. Therefore, the step coil B causes the step pawl 218 to take a new bite in the ratchet 217, a feed step, therefore, being effected for the gang switch B to position No. 22, by the pawl 218 under power of the spring 221. Additionally the operation of the MC switch opens the circuit for the relays CMT and CST, rendering the switches CMT2 and CST2 restored. Now when the MC switch is restored, the solenoids TM and TS operate to trip their respectively associated tabulated mechanisms, the master carriage coming to rest in the position No. 11 and the slave in the position No. 82.

In the position No. 22 of the gang switch B, the tap #22 of the step switch B1 is live which has a lead 228 via two normally open switches CMT1 and CST1 to the relay RD. The switch CMT1 is closed by the tabulating arrival of the master carriage in the position No. 11, wherein the cease-tabulating contact 11, through a lead 229 joining the lead 228 to the tap #22 of the step switch B1, establishes a closed circuit with the CMT relay, the latter operating the CMT1 switch. On the other hand, the switch CST1 is operated as the circuit for the relay CST is closed responsive to the arrival of the slave carriage in the position No. 82, it being noted that the cease-tabulating contact 82 is communicative with the tap #22 on the step switch B2. Consequently in the position No. 22 of the gang switch B, the relay RD becomes closed upon the aggregate arrival of the carriage of the master and the carriage of the slave in each of their respectively required positions. Furthermore, the operation of the said relay RD, by operation of a switch RD1, establishes a holding circuit for itself. For purposes becoming clear hereinafter the RD relay operates also switches RD2, RD3 and RD4.

The operator now types in the description column, on the master typewriter and such typing will be duplicated on the manifest, during which time the explained states of switches will prevail.

If now the description needs to be extended to the second line, the operator depresses the MC key which over a lead 230, the closed switch RD4 and splitting into leads 237 and 232 will close circuits for the CR2 solenoid of the master and the CR1 solenoid of the slave for instituting carriage returns in the master and the slave. Therefore the master carriage returns to the position No. 11 and the slave carriage to the position No. 82 and also the work sheets on both carriages become line spaced. The stated operation of the MC key did not cause an operation of the step coil A because of the operated condition of the switch R2 and did not cause an operation of the step coil B because of the operated condition of the switch RD2. This means that the gang step switch A has remained in the position No. 22. The operator then continues typing the description and as many lines may be added as are necessary by further operations of the MC key and accompanying carriage returns. Meanwhile the RD relay remains active, keeping the switch RD2 open at the switches RD3 and RD4 operated.

If it is now required to go on to the weight column, the operator depresses an end repeat key ER in the keyboard of the master typewriter. This closes the ER switch and thereby closes a circuit for the step coil B over closed switches R3, SO2 and operated switch RD3 and also closes a circuit for the slow acting relay SO to render the circuit open by operating the switch SO2. It follows thus that the gang switch B will be fed by the pawl 218 to the position No. 23 and that now the taps #23 respectively on the switches B1 and B2 are live, and that thus the contacts 40 and 107 are also live. Now then, at the release of the end repeat key the ER switch becomes restored and current is caused to flow through the tabulating instituting solenoids TM and TS, the closed circuits including the leads 203, 204, the unoperated switches CMT2 and CST2. In this connection it is to be understood that in the operated position the ER switch interrupted the holding circuits for the CMT and CST relays and that this resulted in the restorations of the switches CMT2 and CST2. The instituted tabulation is automatically completed as the master and slave carriages reach respectively the positions No. 40 and No. 107, the CMT and CST relays upon arrival of the stated positions becoming effective to operate the switches CMT2 and CST2, rendering the TM and TS solenoids incapacitated against instituting renewed tabulations.

The operator then proceeds to type the weight in the weight column and such data will be typed on both the waybill and the manifest but will not be punched, as may be gathered from the operations-flow diagram. The operation of the MC key thereafter will advance the gang switch B to the position No. 24, the step coil B being operated in response to the downstroke of such key and the TM tabulating solenoid being operated in response to the upstroke of such key. The tap #24 on the switch B1 is now live and so also the cease-tabulating contact 47 on the master which has a connection therewith. The slave is in a disabled state because the tap #24 of the switch B3 has a lead to the DS solenoid.

The tabulating mechanism of the slave is disabled by a lead 233 from the tap #24 of the switch B2 to the CST relay. If now the rate is typed on the master, it will appear only on the waybill. Another operation of the MC switch brings the gang switch B to position No. 25, and, the equivalent taps being live as in the position No. 24, the operations will be repeated, the master carriage arriving in the position No. 53 and the slave carriage remaining stationary. Upon typing in the charges column, the operator has the choice of operating the MC key or the end-repeat key, depending on whether a further entry is to be made beginning the "No. Pkgs." column to and including the charges column. If such further entry is required, she operates the MC key, if not, she operates the end-repeat key. Taking the first case, the depression of the MC key will close a circuit over the lead 210, the switch SO4, the operated switch R2 and the step coil B, whereby the latter is operated. In accompaniment, the relay S is operated to disrupt the circuit for the step coil B after it has operated. Therefore, the gang switch B receives a step feed to the position 26. This makes the tap #26 on the step switch B3 live which through a lead causes the relay N to be active to operate the various N switches including the switches N2, N3 and N4. Thus the tabulation instituting solenoids TM and TS are disabled. Furthermore upon release of the MC switch, a circuit is closed for the energization of the step coil B. This circuit is over closed switch S1B, lead SB, tap #26 of switch B1, lead 225, tap #21 of switch A1, lead 205, operated switch N2, switch D1, return MC switch, closed ER switch and lead 202, etc., to the negative power line 99. The step coil B will thus be operated, the S1B switch interrupting its circuit. Therefore the step pawl 218 feeds the gang switch B to the position 27. The just described step feed of the switch B which resulted in view of the tap #26 is an idle operation interposed merely to use up a surplus step position of the gang switch B, as will become evident later. Depending on the programming requirements there may be more of such idle step feeds.

Resultant to the attained position 27 of the gang switch B, the tap #27 of the step switch B3, through a lead to the N relay causes the latter to remain active, maintaining operated thereby the switches N1, N2, N3 and N4. Taps #27 on the step switches B1 and B2 are now live and because they have connections respectively to the CR3 solenoid of the master and the CR2 solenoids of the slave, these solenoids become operated and institute carriage returns respectively of the master to the letter-feed position 4 and the slave to the letter-feed position 76. The closed circuits for the just stated carriage return solenoids include the operated switch N2, and the unoperated switches D1, MC and ER.

Before the operations of the carriage return solenoids, the switches USM and USS were in their unoperated positons, but resultant to the institution of the carriage returns of the master and the slave by operations of the CR3 and CR2 solenoids, they become operated by their respective rocking structures 122 in the master and slave typewriters. This completes the circuit for the relay D which becomes active to open the switches D1 to D4, inclusive. In turn the step coil B becomes active in that a circuit therefor is closed including closed switch RD2, operated switch R2, unoperated switch SO4, operated switch N1, the operated switches USM or USS, the unoperated switches CMT2, CST2, the lead 204 and the unoperated switches MC and ER. Concomitant with the stated closure of a circuit for the step coil B, the SO relay becomes also operated so that the step coil B relaxes immediately after operation. It follows thus, that now the feed pawl 218 will have advanced the rotor 216 of the gang switch B a further step.

The rotor has a total of 21 step positions and since there are three contact arms 222 related to each switch B1, B2, B3 and B4, the stated further step movement of the rotor will again cause the taps #21 of the various step switches B1 to B4 inclusive, to be controlling. In other words, the stated switches go through a controlling cycle at each ⅓ of a revolution of the rotor. Moreover, at each completion of each ⅓ revolution one of the arms of a three-armed element 223 opens the switch 224, which resultant to the first step operation of the program will again close. The carriages of the master and the slave are now respectively again in the letter-feed positions 4 and 76 and an entry can now be effected again in the "No. Pkgs." column. Thus the process pertaining to the columns up to and including the charges column may be repeated for as many lines as desired.

When finally the operator desires to proceed to the tax column she operates the end repeat key ER. This is usually done after typing in the charges column but may be done at any time after the gang switch B becomes electrically connected with the gang switch A. It may be pointed out here that by operating the ER key in the position 21 of the gang switch B, all the controlling taps of gang switch B can be skipped at the will of the operator. While this is not desired in the example of work shown, it obviously is highly useful for other work applications. In any event the operation of the ER key operates the switch ER and closes a circuit through the step coil A over the unoperated switches RD3, SO2, the operated switches R3 and ER, such circuit being automatically interrupted by the slower operation of the relay SO. Therefore the main gang switch A is now stepped to the position 28 and renders thereby the lead 213 to the relay R dead, and causes in turn the switch R5 to become restored, such switch having been held operated, that is open, by the relay R since the energization of the latter when the gang switch A reached its position 21. It will now be observed that at the stated restoration of the switch R5, a circuit through the step coil B becomes active over the closed switch S1B, the switch 224, the switch R5 and a lead 234. The step coil B, which automatically actuates its circuit interrupting switch S1B, thus operates once or repeatedly until the feed pawl 218 has fed the rotor of the gang switch B to the home position shown in the diagram, at which time one of the arms 223 opens the switch 224.

For the remainder of the program, namely from the positions 28 to the first position, the gang switch A is now again controlling. Following the stated operation of the MC switch the movement of the gang switch B through its position 27, caused a return of the master carriage to the letter-feed position 4, and a return of the slave carriage to the position 76. On the other hand no such carriage returns ensued after operation of the ER key because the step-feed of the gang switch A which immediately resulted, rendered the carriage return controlling taps on the step switches B1 and B2 dead.

It will be noted that no carriage return operations follow the operation of the ER switch and it is now the requirement for the master carriage to tabulate to the position No. 61. The #28 tap of the step switch A accordingly is provided with a connection to the cease-tabulating contact 61. At the release of the ER key the TM solenoid is operated in view of its circuit becoming closed through the switches D2, N4, USM, CMT2, MC, ER and the leads 204 and 202. Therefore the carriage will tabulate to the tax column in response to the movement of which the circuit through the CMT relay becomes active to open the switch CMT2, so that there will be no further tabulation, and so that the carriage comes again under the control of the escapement 49, as is evident from the previous explanations. The slave carriage meanwhile remained stationary because the tap #28 on the step switch B1 caused the energization of the CST relay and thereby effected the operation of the CST2 switch, breaking the circuit for the TS solenoid. The tap #28 on the step switch A4 has a lead to the punch coding and triggering unit, causing a skip code to be punched by the punch. The step switch A3 has a lead from the tap #28 to the relays P and DS, whereby the slave typing mechanism is deconditioned but the slave type keys are nevertheless effective to cause recordings in the punch 51.

The positions Nos. 29 and 30 of the step switch A are obtained by the operation of the MC key and in association with each such switch position there occur substantially the same operations which follow the movement of the step switch to the position No. 14, except that the switch A4 through a tap in each instance causes a skip code to be punched by the tape punch and further that there is no provision for the switch A4 to render the space key potent. From the operations-flow diagram, it will be perceived that if after typing the data into the tax column the operator presses the MC key, the master carriage will consequently tabulate to the position No. 67. Furthermore, if after typing in the collect column the MC key is depressed, the master carriage will tabulate to the position No. 76. A final depression of the MC key after typing in the prepaid column, will then give the gang switch the position No. 31, in which taps #31 on the switches A1 and A2 are effective to institute carriage returns of the master and the slave respectively to the positions Nos. 11 and 12, which are of course the required initial typing positions for the work forms on the master and the slave. Also, the gang switch A is automatically fed to the position No. 32 which position is an excess position available but not actually needed for the particular example of work that has been described. Of course, depending on the number of program steps required for doing any given kind of work there may be more such excess positions. The switch A1 by having a lead SA from the tap #32 via the switch S1 to the step coil A causes the switch A to take the final step to arrive again at the No. 1 position.

The master typewriter embodies an appropriate device to advance the continuous-form waybills for typing upon the next successive waybill but such device is not shown. On the other hand the manifest having been line spaced incidental to the carriage return effected previously, is now positioned for a new set of entries to be communicated thereto by the operation of the master typewriter under program control.

Whenever the operator begins a new run of work, she must be certain that both typewriters have appropriate carriage positions and that the gang switches are in their initial controlling positions to start their controlling function. To assure that this is so, the operator operates the home switch A and also the home switch B. When such home switches are operated the step coils A and B become each repeatedly operated until the feed pawls 199, 218 related therewith have fed the gang switch rotors to their next home positions. In respect to home switch A this is when one of the arms 195 opens the switch 196 and in respect to the switch B this is when one of the arms 223 opens the switch 224. It will be perceived, furthermore, that the operation of either of the home switches will render the holding circuits for the CMT and CST relays open, so that the switches CMT2 and CST2 will for the moment restore to their normal positions. For that reason, when thereafter the home switches A and B are restored they will thereby close circuits embracing the TM and TS solenoids for institutions of tabulations of the master as well as the slave carriage. Resultant also to the restoration of the home switches A and B, the cease-tabulating contact 11 on the master and the cease-tabulating contact 12 on the slave will become live because the taps #1 of both the switches A1 and A2 are active and are connected thereto. Now considering for the moment only the master carriage, if it is advanced beyond the carriage position No. 11, that is beyond the position required to start typing the waybill, it will take a succession of tabulating steps until the carriage reaches a position beyond the last column on the waybill, at which time the automatic carriage return instituting margin stop 185, by its cam 186, will set the carriage return counterstop 163 downwardly to bring it into range with the carriage return terminating margin stop CR2. The said carriage return instituting margin stop furthermore will displace the carriage return counterstop 163 leftwardly in the final tabulating travel to operate the carriage return latch device 160 in a usual manner. There ensues consequently an automatic carriage return which will deposit the carriage in the correct position for starting the waybill, namely the carriage position No. 11.

In connection with the above, it must be appreciated that during the successive tabulating steps hereinabove noted, no signal goes forth to the CMT relay since the carriage carried wiper 143 starts moving from a position beyond the live cease-tabulating contact 11. Preferably the place where the carriage return instituting margin stop 185 becomes effective, coincides with a last tabulating station thereby to assure by its displacement the restoration of the tabulator reed before the carriage return run starts. However, other devices are known to effect such restoration by the tripping of the carriage return mechanism.

In reference to the slave carriage, substantially the same will happen as has been just explained with reference to the master carriage. However, the return instituting margin stop 185 on the slave has a cam element designed to set the carriage return counterstop 163 downwardly two steps for interception of the carriage by the return margin stop CR3. Therefore the return of the slave carriage is effected to the letter-feed position No. 12, which is the appropriate initial position for typing the manifest.

Now coming back again to the master carriage, it is to be noted that if at the time the home switches A and B are operated the carriage happens to be in advance of the position No. 11, then there will simply ensue a tabulation directly to the position No. 11.

In any event, the operation and release of the two home switches A and B will place the gang switches A and B to their initial program positions and will cause the stationing of the master and slave carriages appropriately to start the work.

The machine embodies provision in the form of switches whereby the control of the program apparatus may be cut out and the master may be caused to control the tape punch 51 with or without effecting typing on the slave. If it is desired to make use of this provision, the operator first moves the program switch to the Off position and if typing on the slave is required she moves the "Slave-On-Off" switch to the On position. If typing is not required on the slave, then the stated slave switch is moved to the Off position. In the Off position of said slave controlling switch, current will be supplied from the positive power line 100 over the DS solenoid through a line 240 over the stated "Slave-On-Off" switch, the program switch in its Off position, and both the home switches A and B to the negative power line 99.

In the Off position of the program switch it is further possible to condition the apparatus selectively for the master to control, or not to control, the punch. If thus it is desired for the master to have unprogrammed control over the punch, the twin switch 241 is thrown down to the On position which by its upper switch will cause the relay P to be actuated to close the switch P1 to thereby capacitate the slave type keys 44 for control of the punch 51. Furthermore, the lower switch of the twin switch 241 will then capacitate the switches under the space key 46, the tabulator key 48 and the carriage return keys on the slave. Thus the operation of the space key 46 will send a space signal to the punch triggering unit 52. On the other hand any of the carriage return keys of the slave will send an eject signal to said triggering unit, and the tabulating key will send a skip signal. It will be noted that the "program-On-Off" switch controls a companion switch 242 which is in series with the lower one of the twin switches 241, wherefore with the program switch in On position there can be no signals for the punch from the slave switches underlying the carriage return keys and the tabulator key 48.

Operation of either of the home switches A or B will send current from the positive supply line 148 over the switch 150 or 151 and a lead 147 into a line marked "eject" going to the punch coding unit 52.

Certain resistances 238 are included here and there in the circuits in order to regulate voltages as required. Also a number of selenium rectifiers 239 are provided to prevent reverse current flow. No use has been made of step switch B4, but it is available in case further programming taps are needed. In fact, the number of step switches may be increased for different work applications. In some work applications the gang switch B may be omitted. The programming apparatus is designed to be readily modified to suit all kinds of requirements, and appropriate electrical connections are readily made for such purposes. The numeral 244 identifies plug-board facilities for conveniently altering the program to suit requirements.

In the example of work shown, the slave carriage is always tabulated to the next succeeding column. Obviously, the tabulating program for the slave may be set up to bypass certain columns, similarly as is done in the master. Also similarly, there may be intermediate program instituted carriage returns. It may further be noted that the cease-tabulating contacts in many instances have a function merely to place and hold the CMT2 and CST2 switches into operated position, thereby to prevent the institutions of tabulations, pending some later action.

During the preparation of the waybill, the punch 51 is automatically caused to record certain data on the tape 197. Moreover, there go forth to the punch triggering unit 52, from time to time, skip-signifying signals, and finally also an eject signal, such signals causing control perforations to be made representative thereof. The tape 197, so perforated, is suitable to control a conventional statistical card punch to produce seriatim recordings in a card of the kind shown in Figure 5. In so using the tape 197 it is put through the card punch in reverse direction for the columns to become selected in reference to units order.

Obviously, if desired, a tape punch 51 may be controlled by an appropriately set up programming apparatus to provide a record which subsequently can be used for automatically preparing further type records.

It should be noted that the operator needs to do a minimum of work in addition to operating the type keys on the master. Namely, she is required merely to operate additionally only occasionally the MC key or the ER key. All carriage returns and tabulations on both typewriters occur under program control in accordance with the exact requirement of the work forms. In view of the cease-tabulating contacts which are sensed by the carriages, the tabulating runs are always terminated reliably and exactly in accordance with the program. The programming apparatus is, of course, also very useful in connection with only one typewriter. There may be a greater number of connected typewriters and any number of punches, or none at all.

While the invention has been described with reference to the details shown in the drawings, it is not restricted to the particular construction or method of operation set forth, but is intended to cover such modifications or departures as may be within the purposes or the scopes of the following claims:

We claim:

1. The combination with a record preparing machine, a program apparatus movable to different control positions to set up various instructive conditions in accord with a predetermined plan for mechanisms contained in the machine, of means to move said program apparatus seriatim to the different control positions thereof and including a manually controllable provision whereby a given series of control positions exclusive of other control positions are seriatim repeatable, series on end, for as long as desired.

2. The invention set forth in claim 1, said provision including a step switch movable to afford said control positions of said given series and the program apparatus being controllable to cause said step switch to repeat seriatim said given series of control positions exclusive of the other control positions, series on end.

3. The combination in a record preparing machine having a carriage and means to effect carriage movements in either direction to certain positions; a program apparatus for setting up instructive conditions for said means and for this purpose adapted to be step-fed through a series of different control positions, and means to feed said program apparatus to the different control positions and including manipulative means, dependent on operation or non-operation of which the program apparatus may be caused to feed through a given series of said control positions exclusive of its other control positions more than once at the will of said operator.

4. The invention set forth in claim 3, said program apparatus provided in the form of step-switch means and comprising a primary and a secondary step switch, said secondary step switch adapted to afford said given series of control positions including a home position and adapted to be fed seriatim through its series of control positions once or in excess of once, said primary step switch affording other control positions and also a home position, the apparatus including means whereby said secondary step switch becomes electrically potent in response to said primary step switch arriving in a certain control position.

5. The invention set forth in claim 4, a single homing control means for said step switches, and means to home said two step switches from whatever position each may occupy, to individual home positions thereof under control of said single homing control means.

6. The combination in a record preparing machine having a carriage and means to effect measured carriage movements in either direction, a program apparatus for setting up instructive conditions for said means and for this purpose adapted to be step-fed through a series of different control positions, means to feed said program apparatus to the different control positions seriatim, and means including a manual control to skip at will a certain series of said control positions of the program apparatus.

7. The invention set forth in claim 6, said program apparatus including a step switch adapted to afford said series of skippable control positions.

8. The combination in a record preparing machine having a record device, a carriage movable to locate said record device relatively to a work sheet, and a carriage tabulating mechanism; a program apparatus having successive control positions for setting up instructive conditions for said tabulating mechanism and other devices, and adapted to be fed seriatim to said control positions to set up said instructive conditions, and means to feed said program apparatus to the different control positions and including differentially manipulative means whereby said program apparatus may be controlled to repeat a given series of control positions at the will of the operator.

9. A machine comprising in combination, a recording device, a carriage movable to locate said recording device relatively to a work sheet, a tabulating means for said carriage conditionable into various states wherein it is capable to be called into operation to predetermine tabulating movements of the carriage to specific positions, power carriage returning means conditionable into various states wherein it is capable to be called into operation to predetermine power carriage returns to specific positions, an operations programming apparatus movable to different control positions and adapted in individual control positions thereof, independently of the position of the carriage, to condition the tabulating means into specific ones of its states and adapted in other individual control positions thereof, independently of the position of the carriage, to condition said carriage returning means into specific ones of its states, and manually controllable means to cause the tabulating means and said carriage returning means to function in accord with the specific states to which they become conditioned by the operations programming apparatus.

10. The combination in a machine having a recording device and a carriage movable to locate said recording device relatively to a work medium; power means to move the carriage in opposite directions, means conditionable into various states to predetermine movements of the carriage in opposite directions by said power means to various specific positions, an operations programming apparatus movable to different control positions to produce the various states of said conditionable means, manually operable means, means subject to control by said manually operable means to move said operations programming apparatus from one control position to the next one and to render said power means effective to carry out power movements of the carriage in accord with the given state of said conditionable means, and means including a homing control to cause movement of said operations programming means to initial program position and further to cause said power means to move the carriage to a specific initial recording position.

11. The combination with two typewriters having each a letter-feeding carriage, a typing mechanism and having a set of type keys to which both typing mechanisms are adapted to respond; of a tabulating means for each of the carriages, a program apparatus stepwise movable to different positions to set up individual instructive conditions for one or both said tabulating means to predetermine for each typewriter specific carriage positions to be obtained, manually operable means, and means controllable by said manually operable means to step-feed said apparatus and to cause said tabulating means to function in deference of the instructive conditions set up by the program apparatus.

12. In a record preparing machine having a recording device, a carriage movable to locate said recording device relatively to a work sheet, a series of tabulator stops representing possible tabulating positions for the carriage, means operable to cause single tabulating advancements of the carriage to the successive tabulating positions represented by said stops and including a counterstop for successive cooperation with said stops, a program apparatus stepwise movable to different positions, means controlled by said program apparatus to set up in specific step positions thereof certain instructive conditions for said operable means to control it to operate a required number of times until a specific tabulating position is reached in accord with the instructive condition afforded by the prevalent step position of said program apparatus, and means to cause said operable means to function in accord with the instructive condition afforded by said program apparatus.

13. In a record preparing machine having a recording device, a carriage movable to locate said recording device relatively to a work sheet, a series of tabulator stops representing possible tabulating positions for the carriage, means operable to cause single tabulating advancements of the carriage to the successive tabulating positions represented by said stops and including a counterstop for successive cooperation with said stops, a program apparatus stepwise movable to different positions, means controlled by said program apparatus to set up in specific step positions thereof certain instructive conditions for said operable means to control it to operate a required number of times until a specific tabulating position is reached in accord with the instructive condition afforded by the prevalent step position of said program apparatus, and means including a manually operable control to step-feed said apparatus and then to cause said operable means to function in accord with the obtained instructive condition of said program apparatus.

14. The combination in a machine having a recording device and a carriage movable to locate said recording device relatively to a work medium; power means to move the carriage in opposite directions, means conditionable into various states to predetermine movements of the carriage in opposite directions by said power means to various specific positions, an operations programming apparatus movable to different control positions to produce the various states of said conditionable means, manually operable means, and means subect to control by said manually operable means to move said operations programming apparatus from one control position to the next one and to render said power means effective to carry out power movements of the carriage in accord with the given state of said conditionable means.

15. The invention set forth in claim 14, said programming apparatus including means effective in certain control positions thereof to move it automatically to a further controlling position.

16. The combination in a machine having a printing device and a carriage movable to locate said printing device relatively to a work medium; power means to move the carriage in opposite directions, means conditionable into various states to predetermine movements of the carriage in opposite directions by said power means to various specific positions, an operations programming apparatus movable to different control positions to produce the various states of said conditionable means, manually operable means, means subject to control by said manually operable means to move said operations programming apparatus from one control position to the next one and to render said power means effective to carry out power movements of the carriage in accord with the given state of said conditioning means, means adapted to effect recordings automatically in combinational code of that which is printed by said printing device, and means controlled by the operations programming apparatus to predetermine what recordings by said printing device are to be recorded in combinational code by said effecting means.

17. The invention set forth in claim 16, and means to control said combinational code recording means to effect certain combinational recordings automatically under control of said programming apparatus.

18. The combination in a machine having a recording device and a carriage movable to locate said recording device relatively to a work medium; tabulating means for said carriage, comprising, a series of stops defining possible tabulating positions for the carriage and a counterstop for successive stopping cooperation with said stops, said tabulating means operable to effect each time a tabulating advance of the carriage to a position defined by the next successive one of said stops and responsive to each conclusion of a tabulating advance assuming automatically a state for renewed operation, an operations control apparatus adapted to be moved to different control positions, means differentially controlled by said apparatus by its reaching certain control positions to establish individually for each such position a cease-tabulating control condition which is adapted to be sensed by the carriage as it advances to a required tabulating position, means to operate said tabulating means and to cause automatically its reoperation at each assumption of its said state, and means responsive to the sensing of a cease-tabulating control condition by the carriage to prevent reoperations of said tabulating means.

19. The combination in a record preparing machine having a recording device and a carriage movable to locate said recording device relatively to a work sheet, a series of tabulator stops representing tabulating positions for the carriage, tabulating means to effect tabulating advances of the carriage to successive positions determined by said stops and including a counterstop for successive stopping cooperation with said stops, solenoid means to call said tabulating means into action and thereafter adapted to respond automatically to the conclusion of each tabulating advance of the carriage to call said tabulating means again into action, an operations control apparatus adapted to be moved to different control positions, electrical contacts defining certain tabulating positions, means controlled by said apparatus in reaching certain control positions to render for each such certain control position one of said contacts electrically potent, means to sense the electrically potent contact by advance movement of the carriage, and means responsive to the action of said sensing means to prevent said solenoid means from being further active.

20. The invention set forth in claim 19, and a removable unit to support said electrical contacts.

21. The invention set forth in claim 20, the said contacts being rendered electrically potent by said program apparatus by electrical leads, and separable connecting device common to all said leads to remove said contact supporting unit.

22. The combination with a plurality of record preparing machines having each its own recording device and a carriage movable to locate its recording device relatively to a work medium; power means on each machine to move the carriage thereon in opposite directions, means for each machine conditionable into various states to predetermine movements for their carriages independently of each other in opposite directions by their power means to various specific positions, an operations programming apparatus common to both said machines movable to different control positions to produce successively the various states of said conditionable means, manually operable means, and means subject to control by said manually operable means to move said programming apparatus from one control position to the next one and to render the power means in both machines effective to carry out the predetermined power movements of the carriage in accord with the given states of said conditionable means.

23. The invention set forth in claim 22, said recording devices being of a printing kind, means adapted to effect recordings automatically in combinational code of the printings made at least by one of said printing recording devices, and means controlled by the program apparatus by its control positions to predetermine what recordings made by said one printing recording device are to be recorded in combinational code by said effecting means.

24. The combination with a plurality of record preparing machines having each a recording device and a carriage to locate such recording device relatively to a work sheet, carriage tabulating means on each machine, comprising, a series of tabulator stops on each machine representing possible tabulating positions; a counterstop for successive carriage stopping cooperation with the stops on such machine, each tabulating means operable to produce a tabulating advance of its related carriage to the position defined by the next engageable stop, an apparatus adapted to be moved to different control positions, electrical contacts for each machine defining relatively the positions of the tabulating stops, means controlled by said apparatus in reaching certain of its control positions to render in each such position a particular one of said contacts electrically potent, means on each machine to sense its electrically potent contact by advance movement of the carriage, a control, a solenoid on each machine related to the tabulating means thereof and responsive to said control to operate it and thereafter adapted to respond automatically to the carriage stopping cooperation of any stop with the counterstop on the same machine to reoperate the same tabulating means, and means responsive to the action of the sensing means in each machine to render its related solenoid unable for further automatic response.

25. The combination with a plurality of record preparing machines having each a recording device and a carriage to locate such recording device relatively to a work sheet, carriage tabulating means on each machine, comprising, a series of tabulator stops on each machine representing possible tabulating positions, a counterstop for successive carriage stopping cooperation with the stops on such machine, each tabulating means operable to produce a tabulating advance of its related carriage to the position defined by the next engageable stop, an apparatus adapted to be moved to different control positions, electrical contacts for each machine defining relatively the positions of the tabulating stops, means controlled by said apparatus in reaching certain of its control positions to render in each such position a particular one of said contacts electrically potent, a cease-tabulating relay related to each tabulating means, means on each machine to sense its electrically potent contact by advance movement of the carriage and to cause thereby the operation of the cease-tabulating relay of that machine, a holding circuit for each of said cease-tabulating relays including each a holding switch biased to open, and closed automatically at energization of said relay, a solenoid on each machine related individually to its tabulating means, a control, a normally closed switch common to both said holding circuits, opened by operation of said control and permitting thereby each holding switch to restore, means responsive to each operation of said control to place said apparatus in a new control position, one of said cease-tabulating contacts on one machine being electrically live in one control position of said apparatus, means on each machine to sense its live contact by advance movement of the carriage, means also controlled by said apparatus in said one control position to close the cease-tabulating relay related to the other machine independently of the sensing means and thereby causing the related holding circuit to stay closed, individual means related with said holding switches so that opening of either will close an open gap in the circuit for its related tabulation solenoid, means controlled by the restoration of said control to complete a circuit for such solenoid which has its said circuit gap closed, means in each machine to open the circuit of its solenoid automatically and adapted to respond automatically in that machine to the carriage stopping cooperation of any stop with the related counterstop to reoperate the same tabulating means, and means responsive to the action of the sensing means in each machine to render its related solenoid incapable of further automatic response in the prevalent control position of the apparatus.

26. A record preparing machine comprising in combination a recording device, a carriage movable to locate said recording device relatively to a work sheet, a carriage tabulating mechanism, a power carriage return mechanism adapted to be called into action and being self-restoring to an idle state in response to a return movement of the carriage to a predetermined position, a program apparatus adapted to be fed sequentially to a series of control positions for setting up instructive conditions for said mechanisms, means to step-feed said apparatus comprising a step coil, a normally open control switch, a normally closed switch, said switches associated in a circuit with said step coil so that normally the closure of said control switch will energize said step coil to cause a step-feeding operation of said apparatus, means to open said normally closed switch by the feed of said step switch to a certain position and to establish a condition for said first control switch so that if it is actuated it will call said carriage return means into action, means including another control switch to energize said step coil independently of said first control switch whereby said apparatus can be step-fed past said certain position and whereby said first control switch, if operated, is again able to energize said step coil.

27. A machine comprising in combination, a recording device, a carriage movable to locate said recording device relatively to a work sheet, a carriage tabulating mechanism, a power carriage return mechanism adapted to be called into action and being self-restoring to an idle state in response to a return movement of the carriage to a predetermined position, a program apparatus adapted to be fed sequentially to a series of control positions for setting up instructive conditions for said mechanisms, a first key, a second key, means normally responsive to said first key to step-feed said apparatus and cause said mechanisms to function in accord with the new instructive condition set up therefor, means controlled by said program apparatus to render said step-feeding means unresponsive to said first key when said program apparatus reaches a certain control position and by a instructive condition set up in such control position to render said first key operative to call said carriage return means into operation, and means operable in said certain control position of said apparatus to effect a step-feed of the latter under control of said second key, thereby to render said step-feeding means renewedly responsive to said first key.

28. In combination, two typewriters, a typewriting mechanism in each typewriter including each a continuously operating power member and elements individually associable with said power member selectively to receive motions to effect typing operations, a set of typing keys, means on each typewriter responsive to the individual keys of said set, to associate corresponding ones of said elements in the two typewriters with their power members for effecting corresponding typing operations in the two typewriters, means on at least one typewriter to suppress the association of the said elements in such typewriter with its power member but without preventing in such typewriter operation of the key responsive means, individual switch means closeable by the operations of the individual responsive means in said one typewriter, a combinational code-recording device, and means to control said device by said switches to effect combinational recordings representative of the operated responsive means in said one typewriter.

29. In combination, two typewriters, a typewriting mechanism in each typewriter including each a continuously operating power member and elements individually associable with said power member selectively to receive motions to effect typing operations, a carriage on each typewriter, a set of typing keys, means on each typewriter responsive to the individual keys of said set to associate corresponding ones of said elements in the two typewriters with their power members for effecting corresponding typing operations in the two typewriters, means on at least one typewriter to suppress the association of the said elements in such typewriter with its power member but without preventing in such typewriter operation of the key responsive means, means on each typewriter to letter-feed the carriage in response to each typing operation, individual switch means closeable by the operations of the individual responsive means in said one typewriter, a combinational code-recording device, means to control said device by said switches to effect combinational recordings representative of the operated responsive means in said one typewriter, means common to all said switches to render said recording device either responsive or unresponsive, and a program apparatus movable to different control positions to set up various instructive conditions for predetermining carriage movements, to control said last means and to control said suppressing means.

30. In combination, two machines having each a printing device and a carriage to locate a work medium relatively to its related printing devices, a set of printing keys to which both said printing devices are adapted to respond for selective printing, power means to move the carriage in opposite directions, means conditionable into various states to predetermine movements of the carriage in opposite directions by said power means to various specific positions, an operations programming apparatus movable successively to different control positions to produce said various states of said conditionable means, means adapted to effect recordings automatically in combinational code under control of said keys, manually operable means, means subject to the control by said manually operable means to move said operations programming apparatus to successive control positions and to render said power means effective to carry out power movements of the carriage in accord with the state which said operations programming means has given to said conditioning means, and means controlled by said operations programming apparatus to predetermine at least in reference to one of the printing devices when it is to be responsive to said keys and also to predetermine when said combinational recording means is to be responsive to said keys.

31. The invention set forth in claim 30, the said operations programming means including a provision whereby a given series of said control positions are repeatable in succession for as long as desired.

32. The combination in a record preparing machine having a carriage, a carriage tabulating means and a power carriage returning means, a program apparatus stepwise movable and in certain step positions thereof adapted to set up instructive conditions for the tabulating means to predetermine therefor specific tabulated carriage positions to be obtained, and in at least one step position intermediate said certain step positions predeterming an operation of said power carriage returning means, manually operable means, and means controllable by said manually operable means to step-feed said apparatus and to cause said power carriage return means to function if said program apparatus is in said one step position, but if said program apparatus is in one of said certain step-positions, to cause said tabulating means to function in deference of the prevalent instructive condition afforded by the program apparatus.

33. The combination in a record preparing machine having a carriage and means to effect measured carriage movements in either direction, a program apparatus for setting up instructive conditions for said means and for this purpose adapted to be step-fed through a series of different control positions, means to feed said program apparatus to the different control positions seriatim, and means including a manual control to skip at will from within an intermediate range of different control positions to the last control position of such range.

34. The combination in a record preparing machine having a frame, a recording device and a carriage movable to locate said recording device relatively to a work sheet, a series of tabulator stops representing tabulating positions for the carriage, tabulating means to effect tabulating advances of the carriage to successive positions determined by said stops and including a counterstop for successive stopping cooperation with said stops, solenoid means to call said tabulating means into action and thereafter adapted to respond automatically to the conclusion of each tabulating advance of the carriage to call said tabulating means again into action, an operations control apparatus adapted to be moved to different control positions, electrical contacts defining certain tabulating positions, means controlled by said apparatus in reaching certain control positions to render for each such certain control position one of said contacts electrically potent, electrical sensing means for cooperation with said contacts, said contacts and said sensing means being oppositely on said frame and said carriage and each of said contacts adapted to be sensed by said sensing means as the tabulating position which each defines is being approached, and means to render said solenoid means unresponsive at the conclusion of any tabulating advance of the carriage in which said sensing means senses an electrically potent contact.

35. The invention set forth in claim 27, and means responsive to said second key after said step feeding means becomes responsive thereto to cause said mechanisms to function in accord with the new instructive condition which becomes set up therefor.

36. The combination with a recording machine having a recording device and a movable carriage whereby said recording device is locatable relatively to a work sheet; of a tabulating means for said carriage, a program apparatus stepwise feedable to different program positions and including means associated with said tabulating means to set up in the reaching of specific program positions of said program apparatus, distinctive instructive conditions for said tabulating means to predetermine in each instance a tabulation of the carriage to a specifically programmed position, means to step-feed said apparatus and means to cause said tabulating means to function in deference of each distinctive instructive condition which said associated means attains.

37. The combination with a recording machine having a recording device and a movable carriage whereby said recording device is locatable relatively to a work sheet; of a tabulating means for said carriage, a program apparatus stepwise feedable to different positions and in at least some specific positions thereof adapted to set up individual instructive conditions for said tabulating means to predetermine specific carriage positions to be obtained, a control operable and biased to restore, means to step-feed said apparatus in response to the operation of said control, and means responsive to the restoration of said control to cause said tabulating means to function in deference of the instructive conditions set up by the program apparatus.

38. The combination with two recording machines having each a recording device and a movable carriage whereby each recording device is locatable relatively to a work sheet; of a tabulating means for each one of the carriages, a program apparatus stepwise movable to different positions to set up individual instructive conditions for either or both said tabulating means to predetermine specific carriage positions to be obtained in said recording machines, means to step-feed said apparatus and means to cause each of said tabulating means to function in deference of the instructive conditions set up therefor by the program apparatus.

39. The combination with two recording machines having each a recording device and a movable carriage whereby each recording device is locatable relatively to a work sheet; of a tabulating mechanism for each carriage, a power carriage return mechanism for each carriage, each power carriage return mechanism adapted to be called into operation and being self-restoring to an idle state in response to a return movement of its related carriage to a predetermined position, a first key, a program apparatus adapted to be fed sequentially to a series of control positions for setting up for each machine required instructive conditions for said tabulating and carriage return mechanisms, means ordinarily adapted to be called into operation under control of said key to feed said program apparatus to a new control position and then in accord with new instructive conditions set up thereby to cause any of said mechanisms to operate, said program apparatus in at least one of its positions setting up instructive conditions for the tabulating means of both machines, whereby under control of said key said program apparatus may be fed to such one position and the tabulating means caused to function in accord with the consequently set up instructive conditions, means conditioned automatically in response to the tabulations being carried out in the said one position of said program apparatus, to cause said key to become uncontrolling in respect to said feeding means and to render the carriage return mechanism of at least one machine subject to being called into operation by said key, another key, and means controllable by said other key to cause a feed of said program apparatus to a new control position and additionally to cause the carrying out of such operations which may be called for by the newly obtained instructive conditions for said mechanisms.

40. The combination with two recording machines having each a recording device and a movable carriage whereby each recording device is locatable relatively to a work sheet; of a tabulating mechanism for each carriage, a power carriage return mechanism for each carriage, each power carriage return mechanism adapted to be called into operation and being self-restoring to an idle state in response to a return movement of its related carriage to a predetermined position, a first key, a program apparatus adapted to be fed sequentially to a series of control positions for setting up for each machine required instructive conditions for said tabulating and carriage return mechanisms, means ordinarily adapted to be called into operation under control of said key to feed said program apparatus to a new control position and then in accord with new instructive conditions set up thereby to cause any of said mechanisms to operate, means to prevent further response of said feeding means to said key after a particular position of the program apparatus is reached and in operations of said key thereafter to call select ones of said power carriage return mechanisms into operation, another key, and means controllable by such other key in at least said one position of said program apparatus to cause an operation of the feeding means for the latter, whereby then said feeding means is again responsive to said first key and whereby again said mechanisms are adapted to operate in accord with the instructive conditions being set up by said program apparatus.

References Cited in the file of this patent

UNITED STATES PATENTS

| | | |
|---|---|---|
| 2,255,011 | Lake et al. | Sept. 2, 1941 |
| 2,291,154 | Fettig | July 28, 1942 |
| 2,313,752 | Le Clair | Mar. 16, 1943 |
| 2,403,006 | Lake et al. | July 2, 1946 |
| 2,540,030 | Hamilton et al. | Jan. 30, 1951 |
| 2,605,879 | O'Halloran | Aug. 5, 1952 |
| 2,830,865 | Meadows et al. | Apr. 15, 1958 |